United States Patent [19]

Heseltine et al.

[11] 4,003,750

[45] Jan. 18, 1977

[54] SILVER HALIDE EMULSION CONTAINING PHOTOGRAPHIC SENSITIZING DYES

[75] Inventors: Donald W. Heseltine; Donald W. Kurtz; Derek D. Chapman; James K. Elwood, all of Rochester, N.Y.

[73] Assignee: Eastman Kodak Company, Rochester, N.Y.

[22] Filed: May 3, 1973

[21] Appl. No.: 356,980

[52] U.S. Cl. .................................. 96/129; 96/130; 96/131; 96/132; 96/135; 96/136; 96/141; 260/240.4; 260/240.6; 260/240.65; 260/240.7; 260/240.9

[51] Int. Cl.$^2$ .................... G03C 1/24; G03C 1/16

[58] Field of Search ............ 96/131, 136, 139, 141, 96/135, 129

[56] References Cited

UNITED STATES PATENTS

| | | | |
|---|---|---|---|
| 2,689,849 | 9/1954 | Brooker | 96/131 |
| 2,743,274 | 4/1956 | Brooker | 96/141 |
| 2,748,115 | 5/1956 | Brooker et al. | 96/136 |
| 3,173,791 | 3/1965 | Kalenda | 96/141 |
| 3,243,298 | 3/1966 | Libeer et al. | 96/127 |
| 3,384,489 | 5/1968 | Lincoln et al. | 96/136 |
| 3,772,034 | 11/1973 | Fumia | 96/136 |
| 3,772,278 | 11/1973 | Jeffreys et al. | 260/240.4 |
| 3,809,691 | 5/1974 | Carpenter et al. | 260/240 E |

FOREIGN PATENTS OR APPLICATIONS

| | | | |
|---|---|---|---|
| 519,660 | 4/1940 | United Kingdom | 260/296 |

*Primary Examiner*—J. Travis Brown
*Attorney, Agent, or Firm*—J. G. Levitt

[57] ABSTRACT

Methine dyes comprising first and second nuclei joined by a double bond or a methine linkage. The first nuclei may be either
a. a pyrido nucleus joined at the 4- or 6-carbon atom thereof to said double bond or methine linkage or,
b. a 5,6-dihydropyrido nucleus joined at the 4- or 5-carbon atom to said double bond or methine linkage.

The pyrido or dihydropyrido nucleus can have fused to its 1,2-side the atoms required to complete a ring containing 5 or 6 atoms. The second nuclei may be either the same as (a) or (b) or can be of the type typically used in cyanine styryl and merocyanine dyes. Such dyes are useful filter dyes and spectral sensitizers for silver halide compositions. Also described are intermediates useful in the synthesis of said dyes.

19 Claims, No Drawings

SILVER HALIDE EMULSION CONTAINING PHOTOGRAPHIC SENSITIZING DYES

This invention relates to methine dyes, and to light-sensitive photographic silver halide grains spectrally sensitized with such dyes.

Brooker U.S. Pat. Nos. 2,689,849 issued Sept. 21, 1945 and 2,743,274 issued Apr. 24, 1956, Brooker et al U.S. Pat. No. 2,646,430 issued July 21, 1953, describe quinoline methine dyes in which the quinoline nucleus has various groups fused thereto. There is no suggestion in these patents of methine dyes containing a pyrido or a 1,2-dihydropyrido nucleus, nor is there any disclosure as to how such methine dyes could be prepared.

In accordance with this invention, methine dyes are provided comprising first and second nuclei joined by a double bond or a methine linkage; one of said nuclei being a pyrido nucleus joined at the 4- or 6 carbon atom thereof to said double bond or methine linkage, or a 5,6-dihydropyrido nucleus joined at the 4- or 5-carbon atom to said double bond or methine linkage, said pyrido or dihydropyrido nucleus having fused to the 1,2-side thereof the atoms required to complete a ring containing 5 or 6 atoms. Preferably, the pyrido or dihydropyrido nucleus has fused to the 1,2-side thereof the atoms required to complete a ring selected from the group consisting of an indole ring, a thiazole ring, an oxazole ring or an imidazole ring. Typical useful dyes are cyanine dyes comprising first and second nuclei joined by a linkage selected from the group consisting of a monomethine linkage and a trimethine linkage, one of said nuclei being a pyrido nucleus joined at the 4- or 6-carbon atom thereof to said monomethine or trimethine linkage, or a 5,6-dihydropyrido nucleus joined at the 4- or 5-carbon atom to said monomethine or trimethine linkage, said pyrido or dihydropyrido nucleus having fused to the 1,2-side thereof the atoms required to complete a ring containing from 5 to 6 atoms. Also useful are merocyanine dyes comprising first and second nuclei joined by a double bond or a dimethine linkage, one of the nuclei of said merocyanine dye being a pyrido nucleus joined at the 4- or 6-carbon atom thereof to said double bond or dimethine linkage, or a 5,6-dihydropyrido nucleus joined at the 4- or 5-carbon atom to said double bond or methine linkage, said pyrido or dihydropyrido nucleus having fused to the 1,2-side thereof the atoms required to complete a ring containing from 5 to 6 atoms.

As used herein, the terms "pyrido" and "dihydropyrido" include substituted and unsubstituted monocyclic rings, such as the pyrido and dihydropyrido rings appearing in the formulas shown below.

The dyes of this invention are useful as filter dyes and spectral sensitizers for silver halide compositions. Certain dyes are particularly useful sensitizers for negative, developing-out emulsions. Some of the present dyes have maximum sensitization in the infrared (760 nm) region or in the short red (about 610 nm) region, where relatively few methine dyes have maximum sensitization. Certain dyes hereof are useful desensitizers for silver halide emulsions useful in processes such as described by Steward et al U.S. Pat. No. 3,250,610 issued May 10, 1966.

Some particularly useful dyes of this invention have one of the following formulas:

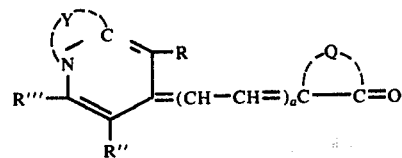

I.

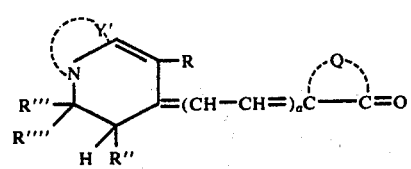

Ia.

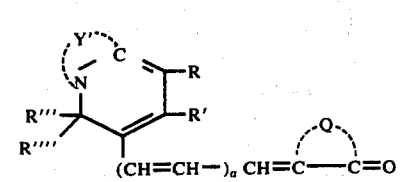

II.

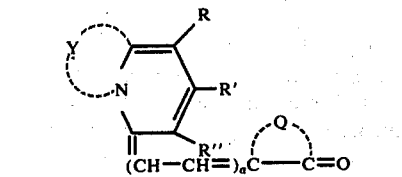

IIa.

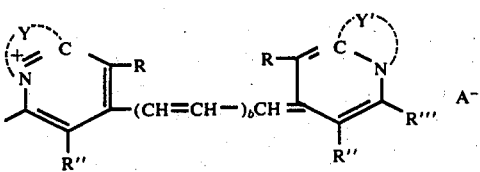

III.

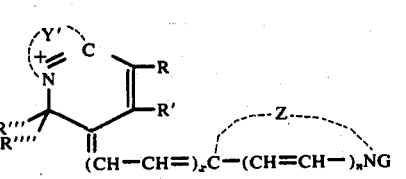

IV.

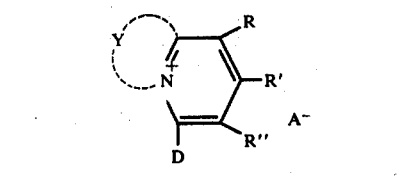

IVa.

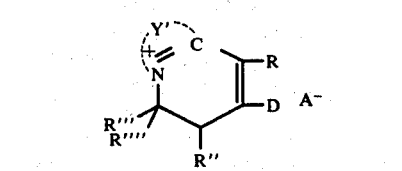

V.

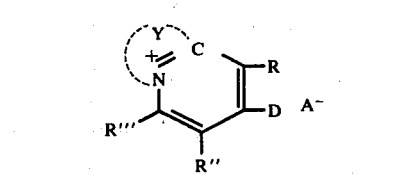

VI.

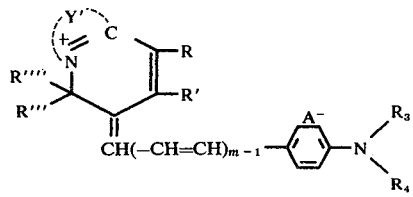

VII.

wherein:

Y represents the non-metallic atoms necessary to complete a heterocyclic ring of 5 or 6 atoms including the nitrogen atom in the 1,2-dihydropyridine or pyridine nucleus, such as an indole nucleus; a thiazole nucleus such as a benzothiazole nucleus, a naphthothiazole nucleus, an acenaphtho[1,2-d]thiazole nucleus; an oxazole nucleus such as a benzoxazole nucleus; or a selenazole nucleus such as benzoselenazole; an imidazole nucleus such as imidazo[4,5-b]quinoxaline nucleus or a benzimidazole nucleus;

Y' represents the non-metallic atoms necessary to complete a heterocyclic ring of from 5 to 6 atoms including the nitrogen atom in the 1,2-dihydropyridine or pyridine nucleus, such as, a thiazole nucleus, a benzothiazole nucleus, a naphthothiazole nucleus, an acenaphtho[1,2-d]thiazole nucleus; an oxazole nucleus such as a benzoxazole nucleus; or selenazole nucleus such as benzoselenazole; an imidazole nucleus such as imidazo[4,5-b]-quinoxaline nucleus or a benzimidazole nucleus;

R, R', R" and R'" each can represent hydrogen, an alkyl group (including substituted alkyl groups) preferably having from 1 to 8 carbon atoms such as methyl, ethyl, propyl, octyl, etc., an aryl group (including subsituted aryl groups) preferably having from 6 to 20 carbon atoms such as phenyl, 4-methylphenyl, 2-methylphenyl, 4-chlorophenyl, 4-methoxyphenyl, naphthyl, etc., arylalkyl such as benzyl, phenethyl, etc., and in ring systems of Y' R, can also represent an alkoxy group which preferably has from 1 to 8 carbon atoms, such as methoxy, ethoxy, propoxy, butoxy, etc., or an aryloxy group having from 6 to 20 carbon atoms such as phenoxy, 4-methylphenoxy, etc., and when Y or Y' represent the atoms required to complete a benzimidazole nucleus R can also represent a alkoxycarbonyl group having from 3 to 12 carbon atoms such as methoxycarbonyl, ethoxycarbonyl, etc.;

R"" represents hydrogen or an alkyl group having from 1 to 8 carbon atoms such as methyl, ethyl, octyl, etc.;

$a$ has a value of 1 or 2;

Q represents the nonmetallic atoms necessary to complete a heterocyclic nucleus containing 5 or 6 atoms in the heterocyclic ring, such as a heterocyclic nucleus of the 2-pyrazolin-5-one series (e.g.., 3-methyl-1-phenyl-2-pyrazolin-5-one, 3-ethyl-1-phenyl-2-pyrazolin-5-one, 1-methyl-3-phenyl-2-pyrazolin-5-one, etc.), those of the 3,4,6-triketohexahydropyrimidine or 2,6diketo-4-thiohexahydropyrimidine series (e.g., barbituric acid or 2-thiobarbituric acid) as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, etc., cycloalkyl such as dicyclohexyl, etc., or 1,3-diaryl (e.g., 1,3-diphenyl, 1,3-di(p-chlorophenyl), etc.), or 1-aryl (e.g. 1-phenyl, 1-p-chlorophenyl, 1-p-ethoxycarbonxylphenyl, etc.), or 1-alkyl-3-aryl (e.g., 1-ethyl-3-phenyl, 1-n-heptyl-3-phenyl, etc.) derivatives, etc.; a heterocyclic nucleus of the rhodanine series (e.g., rhodanine, 3-ethylrhodanine, 3-propylrhodanine, 3-butylrhodanine, 3-(p-carboxyphenyl)rhodanine, 3-(p-sulfophenyl)rhodanine, etc.), a heterocyclic nucleus of the hydantoin series (e.g., hydantoin, 1-(p-carboxyphenyl)-3-phenylhydantoin, 1-ethyl-3-phenylhydantoin, etc.), a heterocyclic nucleus of the thiohydantoin series (e.g., 2-thiohydantoin, 1-p-carboxyphenyl-3-phenyl-2-thiohydantoin, 1-p-sulfophenyl-3-phenyl-2-thiohydantoin, 1-ethyl-3-phenyl-2-thiohydantoin, etc.), a heterocyclic nucleus of the 2-thio-2,4-oxazolidinedione series (e.g., 2-thio-2,4-oxazolinedione, 3-p-sulfophenyl)-2-thio-2,4-oxazolidinedione, 3-ethyl-2-thio-2,4-oxazolidinedione, ect.);

A represents an anionic group such as chloride, bromide, iodide, p-toluenesulfonate, thiocyanate, perchlorate, acetate, methylsulfate, ethylsulfate, etc.;

$b$ has a value of 1, 2 or 3;

$x$ has a value of 0, 1, 2 or 3;

$n$ is 0 or 1;

Z represents the nonmetallic atoms necessary to complete a heterocyclic nucleus containing 5 or 6 atoms in the heterocyclic ring, including photographic sensitizing and desensitizing nuclei, such as a heterocyclic nucleus of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-methylenedioxybenzothiazole, 5-hydroxybenzothiazole, etc.), those of the naphthothiazole series (e.g., naphtho[2,1-d]thiazole, naphtho[1,2-d]thiazole, 5-methoxynaphtho[1,2-d]thiazole, 5-ethoxynaphtho[1,2-d]thiazole, 7-methoxynaphtho[2,1-d]thiazole, 8-methoxynaphtho[1,2-d]thiazole, etc.), those of the thieno[2,3-e]benzothiazole series (e.g., 4'-methoxythieno[2,3-e]benzothiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., napth-[2,1-d]oxazole, naphth[1,2-d]oxazole, etc.), those of the selenazole series (e.g., 4-methylselenazole, 4-phenylselenazole, etc.), those of the benzoselenazole series (e.g., benzoselanazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[2,1-d]selenazole, naphtho[1,2-d]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the quinoline series (e.g., 2-quinoline, 4-quinoline, 6-methoxyquinoline, 7-methylquinoline, 8-methylquinoline, etc.), those of the 1-isoquinolin series (e.g., isoquinoline, 3,4-dihydroisoquinoline, etc.,), those of the 3,3-dialkyl-3H-indole series (e.g., 3,3-dimethyl-3H-indole, 3,3,5-trimethyl-3H-indole, 3,3,7-trimethyl-3H-indole, etc.), those of the pyridine series (e.g., 2-pyridine, 4-pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), those of the imidazole series (e.g., imidazole, 4-methylimidazole, 5-ethylimidazole, 4-chloroimidazole, 4,5-dichloroimidazole, 4-methoxyimidazole, 5-phenylimidazole, etc.), those of the benzimidazole series (e.g., benzimidazole, 4-methylbenzimidazole, 5-methylbenzimidazole, 6-methylbenzimidazole, 5,6-dichlorobenzimidazole, 5-chlorobenzimidazole, 5-phenylbenzimidazole, 6-phenylbenzimidazole, etc.), those of the naphthimidazole series (e.g., naphth[2,1-d]imidazole, naphth[1,2-d]imidazole, etc.), or a desensitizing nucleus, such as an imidazo[4,5-b]quinoxaline nucleus, a 5- or 6- nitrobenzothiazole nucleus, or any of the desensitizing nuclei described in Heseltine et al U.S. Pat. No. 3,582,348 issued June 1, 1971;

G preferably represents a lower alkyl group having 1 to 8 carbon atoms such as methyl, ethyl, propyl, butyl, etc., and including substituted lower alkyl groups such as a carboxyalkyl group (e.g., carboxymethyl, carboxyethyl, carboxypropyl, carboxybutyl, etc.), an alkoxycarbonyl group (e.g., methoxycarbonylmethyl, ethoxycarbonylethyl, propoxycarbonylethyl, propoxycarbonylbutyl, etc.), a sulfoalkyl group (e.g., sulfomethyl, sulfoethyl, sulfopropyl, sulfobutyl, etc.), a hydroxyalkyl group (e.g., hydroxymethyl, hydroxyethyl, hydroxypropyl, hydroxybutyl, etc.), phenethyl, benzyl, an alkoxyalkyl group (e.g., methoxyethyl, methoxypropyl, ethoxyethyl, ethoxypropyl, etc.), a sulfoalkoxyalkyl group, as well as an aryl group of 6 to 20 carbon atoms such as phenyl, naphthyl, 4-methylphenyl, 4-chlorophenyl, etc., an alkenyl group such as allyl, etc.;

D represents a group having one of the following formulas

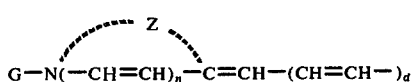

VIII.

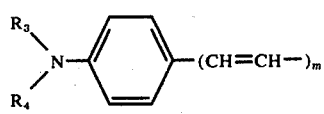

VIIIa.

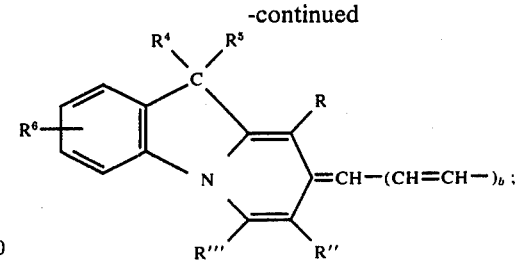

IX.

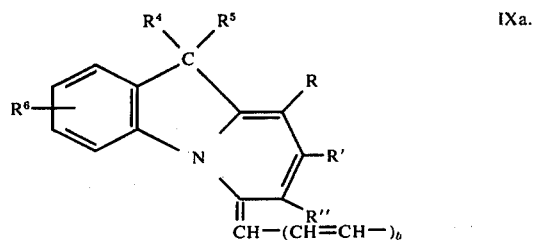

IXa.

wherein $n$, R, R,', R'', R''' and G are as previously defined;

$d$ has a value of 0, 1, 2 and 3;

$m$ is 1 or 2;

$b$ is 0, 1, 2 or 3 and;

$R_3$ and $R_4$ each represents the same or different alkyl groups of 1 to 8 carbon atoms such as methyl, ethyl, propyl, isopropyl, butyl, hexyl, etc;

$R^4$ and $R^5$ each represents an alkyl group such as methyl, ethyl, propyl, butyl, etc., or together represent the atoms necesary to complete a cycloalkyl group such as cyclopentyl, cyclohexyl, etc.;

$R^6$ represents a substituent independently selected from a group consisting of hydrogen, cyano, an alkyl group of 1 to 8 carbon atoms such as methyl, ethyl, propyl, butyl, etc., an aryl group of 6 to 20 carbon atoms such as phenyl, 4-methylphenyl, etc., an alkoxy group of 1 to 8 carbon atoms such as methoxy, ethoxy, propoxy, butoxy, etc., a halogen atom such as chlorine, bromine, etc., or a nitro group. If desired, the above Y and Y' groups can contain more than one $R^6$ group.

Preferably, the groups Y and Y' in Formulas I to VII have the structure

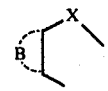

wherein X is a sulfur atom, an oxygen atom, a selenium atom, a carbon atom or a tertiary amino group such as >NR₅ in which $R_5$ is alkyl or aryl, and is attached to the carbon atom adjacent to the nitrogen atom in the dihydropyridine or pyridine nucleus; and B represents the nonmetallic atoms necessary to complete an aromatic nucleus. Typical such Y and Y' groups include:

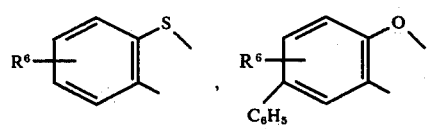

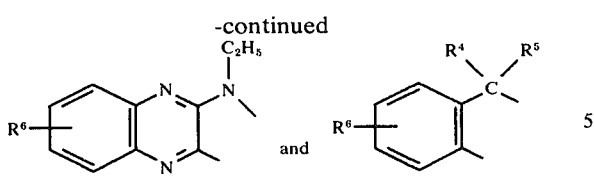

and wherein $R^4$, $R^5$ and $R^6$ are as defined above.

The dyes defined by Formulas I to VII can be prepared by reacting a compound as hereinafter described with an appropriately substituted dihydropyridinium or pyridinium quaternary salt having one of the following formulas:

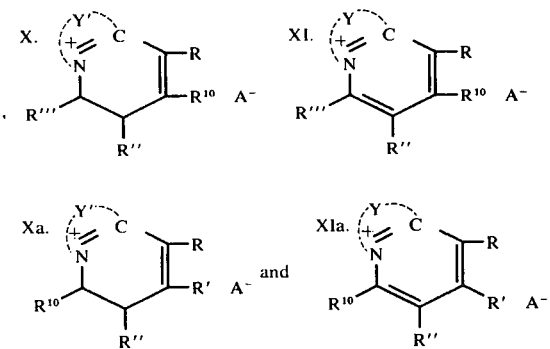

wherein Y, Y', R, R', R'', R''' and A are as previously defined and $R^{10}$ is hydrogen or methyl. Thus, the dyes of Formula I may be prepared by reacting the pyridinium quaternary salt of Formula XI, wherein $R^{10}$ is methyl, with an appropriate reactant as hereinafter described; the dyes of Formula II may be prepared from the dihydropyridinium quaternary salt of Formula X wherein $R^{10}$ is hydrogen; the dyes of Formula III and Formula VI may be prepared from the pyridinium quaternary salts of Formula XI wherein $R^{10}$ is methyl; the dyes of Formula IV may be prepared from the dihydropyridinium quaternary salt of Formula X, wherein $R^{10}$ is hydrogen; the dyes of Formula V may be prepared from the dihydropyridinium quaternary salt of Formula X wherein $R^{10}$ is methyl.

The merocyanine dyes of Formula I may be prepared by heating a mixture of a compound of the formula

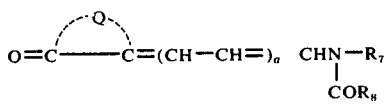

wherein Q and $a$ are as previously defined, $R_7$ represents an aryl group of 6 or 7 carbon atoms, e.g., phenyl, p-tolyl, etc., and $R_8$ represents an alkyl group of from 1 to 12 carbon atoms, with the appropriately substituted compound of Formula XI. The symmetrical cyanine dyes of Formula III can be prepared by heating a mixture of an appropriately substituted compound of Formula XI with diethoxymethyl acetate (forms carbocyanine), trimethoxypropene (forms dicarbocyanine), glutaconaldehyde dianil hydrochloride (forms tricarbocyanine), etc. The unsymmetrical cyanine dyes of Formula IV or IVa and of Formula V or VI containing Group VIII can be prepared by reacting a mixture of the appropriately substituted compound of Formula X, Xa, XI or XIa with a compound selected from the formulas:

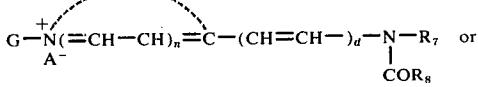

wherein G, $R_7$, $R_8$, Z, A, $n$ and $d$ are as previously defined. The styryl dyes of Formulas IVa, V, VI or VII containing Group VIIIa can be prepared by heating a mixture of the appropriately substituted compound of Formula X or XI with the appropriate N,N-disubstituted p-aminobenzaldehyde or N,N-disubstituted p-aminocinnamaldehyde. The reactions can be accelerated by heating, and generally, temperatures varying from room temperature to the reflux temperature of the reaction mixture can be used. The reactions can be carried out in the presence of solvent such as pyridine, quinoline, isoquinoline, ethanol, n-propanol, n-butanol, etc. Advantageously, the reactions are carried out in the presence of a basic condensing agent such as the trialkylamines (e.g., triethylamine, tri-n-propylamine, tri-n-butylamine, etc.), N-methylpiperidine, N-ethylpiperidine, N,N-dimethylaniline, etc.

The merocyanine dyes of Formulas I, Ia, II and IIa, and the cyanines of Formulas IV, V and VI can be prepared by reacting a compound of the formula:

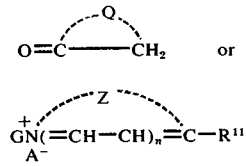

wherein G is as defined above and $R^{11}$ is methyl with an appropriately substituted intermediate having one of the following formulas:

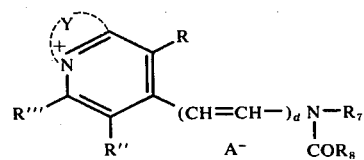

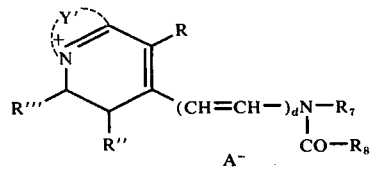

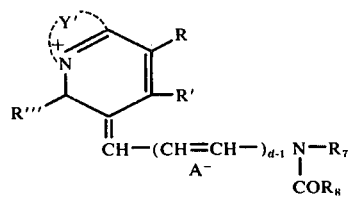

-continued

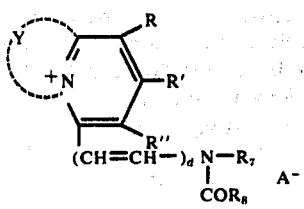

The dyes of this invention are excellent spectral sensitizers for silver halide emulsions. Certain of these dyes, e.g., the dyes of Formula V, promote nucleation in internal image reversal systems. Other dyes, such as the cyanines of Formulas III and VI wherein Y and/or Z completes a desensitizing nucleus a set forth in Fumia and Heseltine U.S. Pat. No. 3,592,653, are useful spectral sensitizers in fogged direct positive emulsions described in the said patent.

The dihydropyridinium quaternary salts of Formula X are prepared as described in Heseltine and Kurtz Belgian Patent 774,787 issued Nov. 12, 1971. The pyridinium quaternary salts of Formula XI may be obtained by the aromatization of the salts of Formula X as by heating in dimethylsulfoxide.

In another aspect of this invention, novel dye intermediates are provided having the formula

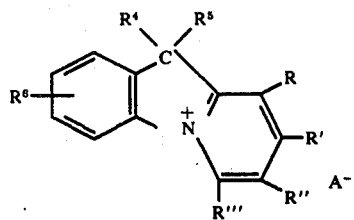

XII wherein R, R', R'', R''', R⁴, R⁵, R⁶ and A have the meanings given above.

The novel intermediates of this invention can be prepared by reacting a 2-substituted-3,3-dimethyl-3H-indolium salt with an ethylenically unsaturated ketone. The preparationn of the subject intermediates is described in Chapman U.S. patent application Ser. No. 305,762 titled *Novel Dye Intermediates* filed Nov. 13, 1972, now abandoned and pending concurrently herewith. These dye intermediates can be used to prepare dyes defined by Formulas I to VII by reacting the intermediates with an appropriate "D" containing intermediate group as defined above.

The dyes of this invention provide spectral sensitization of photographic silver halide emulsions. Photographic silver halide emulsions which may be so sensitized can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal*, Vol. LXXIX, May 1939 (pp. 330–338), double jet emulsions such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 17, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al U.S. Pat. No. 2,592,250 issued May 8, 1952; Porter et al U.S. Pat. No. 3,206,313 issued Sept. 14, 1965; Berriman U.S. Pat. No. 3,367,778 issued Feb. 6, 1968 and Bacon et al U.S. Pat. No. 3,447,927 issued June 3, 1969. If desired, mixtures of such surface and internal image-forming emulsions can be made, such being described in Luckey et al U.S. Pat. No. 2,996,382 issued Aug. 15, 1961. Silver halide emulsions can be regular grain emulsions such as the type described in Klein and Moisar, *J. Phot. Sci.*, Vol. 12, No. 5, Sept./Oct., 1964, pp. 242–251. Negative type emulsions can be made, as well as direct positive emulsions as described in Leermakers U.S. Pat. No. 2,184,013 issued Dec. 19, 1939; Kendall et al U.S. Pat. No. 2,541,472 issued Feb. 13, 1951; Schouwenaars British Pat. No. 723,019 issued Feb. 2, 1955; Illingsworth et al French Pat. No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al U.S. Pat. No. 2,456,953 issued Dec. 21, 1948 and Land U.S. Pat. No. 2,861,885 issued Nov. 25, 1958.

The silver halide emulsions can be unwashed or washed to remove soluble salts after precipitation of the silver halide. In the latter case, the soluble salts can be removed by chill-setting and leaching or the emulsion can be coagulation washed, e.g., by the procedures described in Hewitson et al U.S. Pat. No. 2,618,556 issued Nov. 18, 1952; Yutzy et al U.S. Pat. No. 2,614,928 issued Oct. 21, 1952; Yackel U.S. Pat. No. 2,565,418 issued Aug. 21, 1951; Hart et al U.S. Pat. No. 3,241,969 issued Mar. 22, 1966 and Waller et al U.S. Pat. No. 2,489,341 issued Nov. 29, 1949.

The dyes of this invention are advantageously incorporated in the washed, finished emulsion and should be uniformly distributed throughout the emulsion. The dyes can be added from solutions in appropriate solvents which are compatible with the emulsion and which are substantially free from deleterious effects on the light-sensitive materials.

The types of silver halide emulsions that can be sensitized with the new dyes of this invention include those prepared with hydrophilic colloids that are known to be satisfactory vehicles for dispersed silver halides, for example, emulsions comprising both naturally-occurring substances such as proteins, for example, gelatin, gelatin derivatives, cellulose derivatives, polysaccharides such as dextran, gum arabic and the like; and synthetic polymeric substances such as water-soluble polyvinyl compounds like poly(vinylpyrrolidone), acryamide polymers and the like. The photographic emulsions can also contain alone or in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al U.S. Pat. No. 3,062,674 issued Nov. 6, 1962; Houck et al U.S. Pat. No. 3,220,844 issued Nov. 30, 1965; Ream et al U.S. Pat. No. 3,287,289 issued Nov. 22, 1966; and Dykstra U.S. Pat. No. 3,411,911 issued Nov. 19, 1968.

Other vehicle materials include water-insoluble polymers of alkyl acrylates and methacrylates, acrylic acid, sulfoalkyl acrylates or methacrylates, those which have cross-linking sites which facilitate hardening or curing as described in Smith U.S. Pat. No. 3,488,708 issued Jan. 6, 1970, and those having recurring sulfobetaine units as described in Dykstra Canadian Pat. No. 774,054.

The concentration of the new dyes in the emulsion can vary widely, e.g., from about 25 to 1000 mg. per mole of silver in flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 25 to 1000 mg. of dye per mole of silver is slowly added to the gelatin-silver halide emulsion. With most of the dyes, 50 to 500 mg. of dye per mole of silver suffices to produce the maximum sensitizing effect with the ordinary gelatin-silver bromide (including bromoiodide and chlorobromide) emulsions. With fine grain emulsions, which include most of the ordinarily employed gelatin-silver chloride emulsions, somewhat large concentrations of dye may be necessary to obtain the optimum sensitizing effect. While this procedure has dealt with emulsions comprising gelatin, it will be appreciated that these remarks apply generally to any emulsion wherein all or part of the gelatin is substituted by another suitable hydrophilic colloid as mentioned above. Binderless light-sensitive silver halide grains can also be spectrally sensitized with the dyes of this invention.

Photographic silver halide emulsions spectrally sensitized in accordance with this invention can contain the chemical sensitizers, stabilizers, antifoggants, development modifiers, hardeners, vehicles, plasticizers, coating aids, other spectral sensitizing dyes, etc., and can be coated on supports, such as those described and referred to in Product Licensing Index, Vol. 92, December, 1971, publication 9232, pages 107–110. Such emulsions are useful in photographic elements which may contain developing agents, antistatic layers, matting agents, brighteners, absorbing and filter dyes, color-forming couplers, etc., described and referred to in the above-mentioned Product Licensing Index, pages 108–110. Processing of photographic silver halide grains spectrally sensitized in accordance with this invention can be accomplished by the methods described and referred to on page 110 of the above-identified Product Licensing Index.

The following examples are included for a further understanding of the invention.

EXAMPLE 1

3'-Ethyl-4-phenyl-3-pyrido[2,1-b]benzothiazolothiacyanine iodide

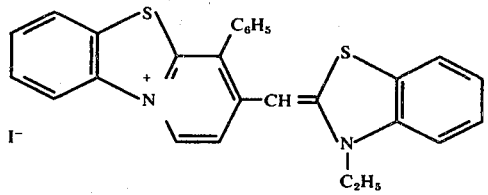

3-Methyl-4-phenylpyrido[2,1-b]benzothiazolium iodide (2.0 g., 0.0056 mole), 2-phenylthio-3-ethylbenzothiazolium iodide (2.23 g., 0.0056 mole), acetonitrile (20 ml.) and triethylamine (0.51 g., 0.0056 mole) are heated to reflux and refluxed for 3 minutes. The solution is cooled, the precipitated dye is filtered and dried to obtain 1.2 g. (39% yield) of the indicated dye. The product has a melting point of 285°–287° C and exhibits an absorption band at $\lambda_{max}$ 493 nm.

EXAMPLE 2

4,4'-Diphenyl-3,3'-pyrido[2,1-b]benzothiazolocarbocyanine bromide

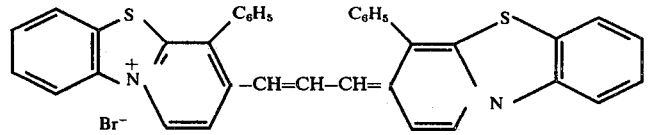

3-Methyl-4-phenyl-3-pyrido[2,1-b]benzothiazolium bromide (2 g., 0.0056 mole), diethoxymethyl acetate (0.9 g., 0.0056 mole), and dimethylacetamide (10 ml.) are heated to reflux and refluxed for 3 minutes, whereupon solid dye precipitates from solution. The solution is cooled, filtered and the solid dye dried to give 0.9 g. (25% yield) of the symmetrical dye. The dye melts at 280°–285° C, with a maximum absorption of 693 nm.

EXAMPLE 3

1,3-Diallyl-1',2'-dihydro-4'-phenyl-1H-imidazo[4,5-b]-quinoxalino-3-pyrido[2,1-b]benzothiazolocarbocyanine bromide

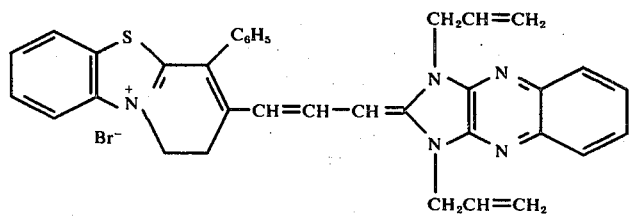

1,2-Dihydro-3-methyl-4-phenylpyrido[2,1-b]benzothiazolium bromide (3.0 g., 0.0084 mole), 1,3-diallyl-2-formylmethylene-2,3-dihydro-1H-imidazo[4,5-b]quinoxaline (2.45 g., 0.0084 mole) and acetic anhydride (40 ml.) are heated to reflux with stirring. Reflux is continued until the solid dye appears, the solution is then cooled rapidly in an ice bath, filtered and the solid dye washed with ether. The yield of crude dye is 2.0 g. (37% yield). Recrystallization of the dye from methanol gives 1.5 g. of dye (28% yield), having a melting point of 215°–220° C and a maximum absorption of 689 nm.

EXAMPLE 4

2-(3-Ethyl-2-benzothiazolinylidene)-1,2-dihydro-4-phenylpyrido[2,1-b]benzothiazolium perchlorate

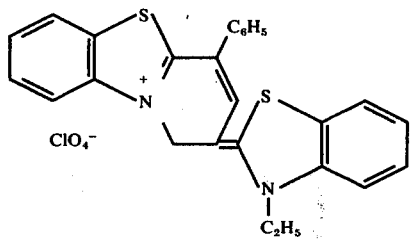

1,2-Dihydro-4-phenylpyrido[2,1-b]benzothiazolium perchlorate (2.0 g., 0.0055 mole), 2-phenylthio-3-ethylbenzothiazolium iodide (2.19 g., 0.0055 mole) and pyridine (30 ml.) are heated to reflux for 3 minutes, the solution is cooled, diethyl ether (30 ml.) is added and the green solution is decanted off from the oily dye. Water is added and the dye solidifies upon cooling. The solid dye is boiled out with isopropyl alcohol. The yield of dye is 1.0 g. (35% yield). The product has a melting point of 120°–128° C with an absorption maximum at 629 nm.

EXAMPLE 5

3'-Ethyl-4,8-diphenyl-3-pyrido[2,1-b]benzoxazolooxacarbocyanine perchlorate

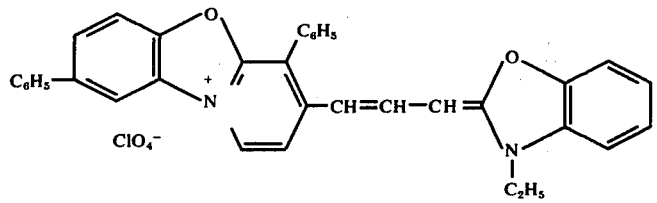

4,8-Diphenyl-3-methylpyrido[2,1-b]benzoxazolium perchlorate (1.1 g.) and 2-(2-acetanilidovinyl)-3-ethylbenzoxazolium iodide (1.07 g.) are dissolved in 35 ml. of ethanol and 8 drops of triethylamine and the mixture is heated on a hot plate for 5 minutes. Cooling to room temperature gives a solid product. Recrystallization from 2-propanol gives the dye which melts at 179°–180° C with decomposition. The product has a $\lambda_{max}$ in methanol of 558 nm.

EXAMPLE 6

3'-Ethyl-4,8-diphenyl-3-pyrido[2,1-b]benzoxazolothiacyanine perchlorate 4,8-Diphenyl-3-methyl-pyrido[2,1-b]benzoxazolium perchlorate (1.6 g.) and 3-ethyl-2-phenylthiobenzothiazolium iodide (1.6 g.) are dissolved in 10 ml. of pyridine and 5 drops of triethylamine and the mixture is heated on a hot plate for 5 minutes. After cooling, excess diethyl ether is added and a dark oil separates. Crystallization from ethanol gives the dye which melts at 214° C. The product has a $\lambda_{max}$ in methanol of 487 nm.

EXAMPLE 7

3',5-Diethyl-4-phenyl-3(5H)-pyrido[1',2':1,-2]imidazo[4,5-b]quinoxalinothiacyanine perchlorate

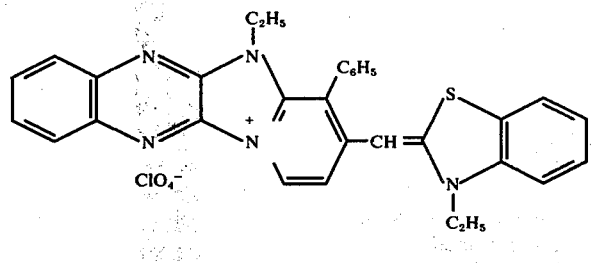

5-Ethyl-3-methyl-4-phenyl-5H-pyrido[1',2':1,-2]imidazo[4,5-b]quinoxalinium perchlorate and 3-ethyl-2-phenylthiobenzothiazolium iodide are reacted by the process described in Example 6. Recrystallization from a 2-propanol/ethanol mixture gives the dye which melts at 222°–225° C with decomposition. The product has a $\lambda_{max}$ in methanol of 550 nm.

EXAMPLE 8

3',5-Diethyl-4-phenyl-3(5H)-pyrido[1',2':1,-2]imidazo[4,5-b]quinoxalinothiacarbocyanine perchlorate 5-Ethyl-3-phenyl-5H-pyrido[1',2':1,2]imidazo[4,5-b]quinoxalinium perchlorate and 2-(2-acetanilidovinyl)-3-ethylbenzothiazolium iodide are reacted by the process described in Example 5. Recrystallization from methanol gives the dye having a melting point of 273°–276° C with decomposition. The product has a $\lambda_{max}$ in methanol of 657 nm.

EXAMPLE 9

3'-Ethyl-4,8-diphenyl-3-pyrido[2,1-b]benzoxazolothiacarbocyanine perchlorate

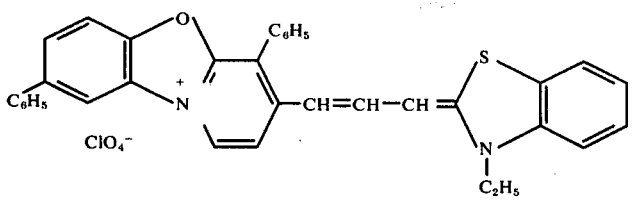

4,8-Diphenyl-3-methylpyrido[2,1-b]benzoxazolium perchlorate (0.4 g.) and 2-[2-acetanilidovinyl]-3-ethylbenzothiazolium perchlorate (0.37 g.) are dissolved in acetonitrile. Triethylamine is added and the solution is heated at reflux for 3 minutes. The mixture is cooled and the dye filtered off. The yield of purified dye after recrystallization from acetonitrile is 0.15 g. (23%). The product has a melting point of 192°–196° C and a $\lambda_{max}$ in methanol of 593 nm.

EXAMPLE 10

3'-Ethyl-4,8-diphenyl-4',5'-benzo-3-pyrido[2,1-b]benzoxazolothicarbocyanine perchlorate 4,8-Diphenyl-3-methylpyrido[2,1-b]benzoxazolium perchlorate (0.4 g.) and 2-(2-anilinovinyl)-1-ethylnaphtho[2,1-d]thiazolium-p-toluenesulfonate (0.5 g.) are dissolved in ethanol. After adding acetic anhydride (2 ml.) and triethylamine (0.5 ml.) the reaction mixture is refluxed for 5 minutes. The purified dye is obtained by chromatography on silica gel in 3% yield. The product has a melting point of 324° C and a $\lambda_{max}$ in methanol of 616 nm.

EXAMPLE 11

Anhydro-4',8'-diphenyl-3-sulfopropyloxa-3'-pyrido[2,1-b]benzoxazolocarbocyanine hydroxide 4,8-Diphenyl-3-methylpyrido[2,1-b]benzoxazolium perchlorate (0.8 g.) and anhydro-2-(2-anilinovinyl)-3-(3-sulfopropyl)benzoxazolium hydroxide (0.7 g.) are added to ethanol (10 ml.). Acetic anhydride (11 ml.) and triethylamine (0.5 g.) are added and the mixture is heated under reflux for 10 minutes. The chilled solution is filtered and the dye is purified by two recrystallizations from ethanol. The yield of dye is 0.025 g. (2%). The product has a melting point of 333° C and a $\lambda_{max}$ in an equal volume solution of methanol and pyridine of 563 nm.

The following examples illustrate the preparation of intermediates useful in preparing the dyes of Examples 1 through 11:

EXAMPLE 12

3-Methyl-4-phenylpyrido[2,1-b]benzothiazolium bromide

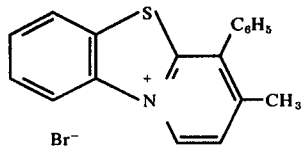

1,2-Dihydro-3-methyl-4-phenylpyrido[2,1-b]benzothiazolium bromide is prepared by reacting 3-(2-acetylethyl)-2-benzylbenzothiazolium bromide (1.0 g.) dissolved in 25 ml. of dimethyl sulfoxide. The reaction mixture is heated to reflux for several minutes and cooled. The resulting tan solid precipitate is filtered, washed with ether and dried to give 0.7 g. (72% yield) of product having a melting point of 208°–210° C. 1,2-Dihydro-3-methyl-4-phenylpyrido[2,1-b]benzothiazolium bromide (1.0 g.) is heated in 15 ml. of dimethylsulfoxide to 160° C and held for several minutes. As the mixture cools, 5 ml. each of ether and ethanol are added, precipitating some of the starting material. The addition of more ether causes the slow crystallization of the product, which on recrystallization from ethanol, is obtained in 30% yield (0.3 g.). The product has a melting point of 285°–287° C with decomposition. The NMR spectrum verifies a completely aromatic ring system. When this example is repeated, except that 3-(2-acetylethyl)-2-methylbenzothiazolium bromide is used as the starting material, there is obtained, in somewhat lower yield, 3-methylpyrido[2,1-b]benzothiazolium bromide, which is a useful intermediate in preparing dyes in accordance with this invention.

EXAMPLE 13

3-Methyl-4,8-diphenylpyrido[2,1-b]benzoxazolium perchlorate

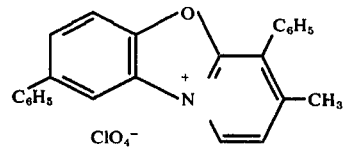

1,3-Dihydro-3-methyl-4-phenylpyrido[2,1-b]-5-phenylbenzoxazolium bromide is prepared by reacting 3-(2-acetylethyl)-2-benzyl-5-phenylbenzoxazolium bromide (5.0 g.) dissolved in 75 ml. of acetonitrile. The reaction mixture is stirred at about 30° C for about 124 hours, after which ether is added to the solution and the resultant precipitate is filtered, washed and dried to give 4.27 g. (93% yield) of 1,2-dihydro-3-methyl-4,8-diphenylpyrido[2,1-b]benzoxazolium bromide having a melting point of 269° C. This product is dissolved in 20 ml. of dimethyl sulfoxide and heated for a few minutes on a hot plate. Sodium perchlorate (0.6 g.) in 20 ml. of ethanol is added with stirring. Excess diethyl ether is added, precipitating an oil. Crystallization of the oily substance is induced from a chloroform-ether solution. Recrystallization from ethanol affords a 70% yield of product having a melting point of 252°–254° C.

EXAMPLE 14

5-Ethyl-1,2-dihydro-3-methyl-4-phenyl-5H-pyrido[1',2':1,2]imidazo[4,5-b]quinoxalinium perchlorate

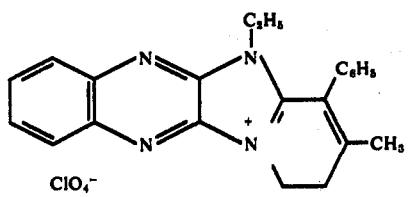

3-Amino-2-ethylaminoquinoxaline (11.5 g.) is added to a solution of phenylacetyl chloride (12.4 g.) in 210 ml. of xylene. The mixture is vigorously refluxed for 3 hours. After cooling, the solution is filtered to remove any amine hydrochloride. Evaporation of the solvent affords a brown oil which crystallizes on cooling. The product, 2-benzyl-1-ethyl-1H-imidazo[4,5-b]quinoxaline, is recrystallized from ethanol to give 9.2 g. (52% yield) having a melting point of 155°–157° C. This product is converted to the hydrobromide salt which has a melting point of 262°–263.5° C with decomposition. Methyl vinyl ketone (2.4 g.) is added to a solution of the 2-benzyl-1-ethyl-1H-imidazo[4,5-b]quinoxaline hydrobromide (5.6 g.) in 90 ml. of dimethylformamide and the mixture is stirred at room temperature for 48 hours. The solution is then poured into excess diethyl ether and the resulting yellow precipitate is collected and dried. NMR analysis shows the product to consist of a mixture of approximately 50:50 of the acetylethyl quaternary salt adduct and the ring-closed product. The mixture is dissolved in ethyl alcohol and heated slightly with a warm solution of sodium perchlorate in ethanol. Cooling affords a yellow precipitate whose NMR and infrared spectra are in agreement with the above structure. Recrystallization three times from isopropyl alcohol affords 2.0 g. of 5-ethyl-1,2-dihydro-3-methyl-4-phenyl-5H-pyrido-[1',2':1,2]imidazo[4,5-b]-quinoxalinium perchlorate having a melting point of 235° C.

Analysis: Calculated — C: 60.0%; H: 4.8%; N: 12.7%; Cl: 8.0%. Found — C: 59.6% H: 4.8% N: 12.5% Cl: 7.7%.

EXAMPLE 15

5-Ethyl-3-methyl-4-phenyl-5H-pyrido[1',2':1,2]imidazo-[4,5-b]quinoxalinium perchlorate

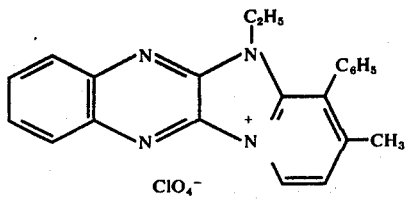

5-Ethyl-1,2-dihydro-3-methyl-4-phenyl-5H-pyrido[1',2':1,2]-imidazo[4,5-b]quinoxalinium perchlorate (3.1 g.) in 40 ml. of dimethyl sulfoxide is heated on a hot plate for 10 minutes. The dimethyl sulfoxide solution is poured into an excess of diethyl either and a green oil separates. The oil is crystallized from a chloroform-ether solution. Recrystallization from chloroform-ether affords 80% yield of product having a melting point of 262°–264° C.

As used in the structural formulas herein, "—$C_2H_5$" is an ethyl group and "—$C_6H_5$" is a phenyl group.

Using a procedure generally similar to that of Example 1, 3-dimethylaminostyryl-4-phenylpyrido[2,1-b]benzothiazolium bromide is obtained by reacting 3-methyl-4-phenylpyrido[2,1-b]benzothiazolium bromide with dimethylaminobenzaldehyde in ethanol and pyridine.

The following example will serve to further illustrate this invention by showing the sensitizing effect of representative dyes of this invention on silver halide emulsions.

EXAMPLE 16

The dyes of Examples 1, 2, 5, 6 and 9 to 11 are tested in a sulfur and gold sensitized, cubic grained gelatino-silver-bromoiodide emulsion containing 2.5 mole percent iodide. The dyes, dissolved in suitable solvents, are added to separate portions of the emulsion at the concentrations indicated in Table I and the emulsions are coated at a coverage of 100 mg. of Ag/ft$^2$ on a cellulose acetate film support. A sample of each coating is exposed to a tungsten light source in a sensitometer through a wedge spectrograph. The coatings are processed six minutes in Kodak D19b developer, fixed in hypo, washed and dried. The photograhic results from these tests are set forth in Table I.

TABLE I

| Dye of Example | Dye Conc. (mg/mole Silver halide) | Sens. max (nm) | Sens. Range (nm) |
|---|---|---|---|
| 1 | 200 | 540 | 380–560 |
| 2 | 100 | 760 | 660–780 |
| 5 | 200 | 610 | 500–660 |
| 6 | 100 | 530 | 380–560 |
| Control | 0 | — | 380–490 |
| 9 | 208 | 640 | 510–710 |
| 10 | 224 | 670 | 520–730 |
| 11 | 200 | 600 | 500–650 |
| Control | 0 | — | 380–490 |

The dyes of Examples 2, 5, and 9 to 11 are excellent sensitizers in their respective ranges. The dye of Example 2 is an exceptionally efficient infrared sensitizer with relatively little desensitization. The dye of Example 5 is an exceptionally good spectral sensitizer at 610 nm, a useful range for red sensitizers for color systems in which a short maximum is desired. This dye also exhibits good chemical sensitization.

The dye of Example 7 is tested as a reversal sensitizer in a fogged direct positive cubic-grained gelatino-silver-bromoiodide emulsion containing 2.5 mole percent iodide as described in Example 16. The emulsion is reduction- and gold-fogged as described in Example 3 of U.S. Pat. No. 3,501,307. On the reversal, this dye is found to have a sensitive range of from 540–650 nm, with a maximum at 600 nm.

EXAMPLE 17

3'-Ethyl-10,10-dimethyl-6-pyrido[1,2-a]indolothiacarbocyanine perchlorate

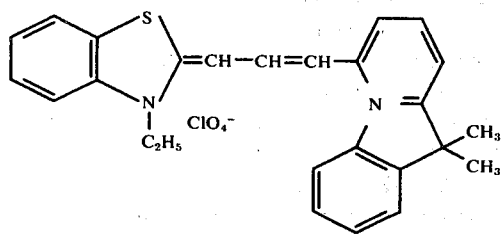

6,10,10-Trimethylpyrido[1,2-a]indolium perchlorate (0.3 g.) and 2-(2-acetanilidovinyl)-3-ethyl-benzothiazolium iodide (0.45 g.) are heated together in ethanol in the presence of triethylamine for 5 minutes. After chilling, the solution is filtered and the precipitated dye is recovered by filtration. The dye is purified by chromatography on silica gel followed by recrystallization from ethanol. The λmax of the product in methanol is 585 nm.

Yield: 0.72 g. (14%); Melting point: 254°–7° C

EXAMPLE 18

10,10,10',10'-Tetramethyl-6-pyrido[1,2-a]indolocarbocyanine perchlorate

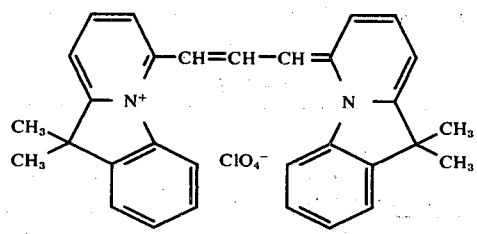

6,10,10-Trimethylpyrido[2,3-a]indolium perchlorate (0.3 g.) and diethoxymethylacetate (2 ml.) are refluxed together in pyridine in the presence of tetramethylguanidine for 3 minutes. The dye is isolated and recrystallized from ethanol. The λmax of the product in methanol is 645 nm.

Yield: 15%; Melting point: 190°–200° C

EXAMPLE 19

3'-Ethyl-10,10-dimethyl-6-pyrido[1,2-a]indolothiacyanine perchlorate

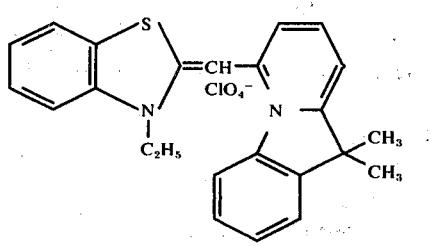

6,10,10-Trimethylpyrido[1,2-a]indolium perchlorate (0.62 g.) and 3-ethyl-2-phenylthiobenzothiazolium iodide (0.8 g.) are refluxed together in pyridine in the presence of triethylamine for 5 minutes. The dye is precipitated by the addition of ether to the cooled solution and is purified by chromatography on silica gel followed by recrystallization from ethanol. The λmax of the product in methanol is 487 nm.

Yield: 0.25 g. (27%); Melting point 223°–4° C

EXAMPLE 20

3-Ethyl-5-[(6,10-dihydro-10,10-dimethylpyrido[1,2-a]-indol-6-ylidene)ethylidene]rhodanine

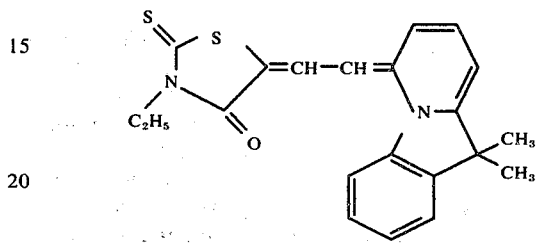

6,10,10-Trimethylpyrido[1,2-a]indolium perchlorate (0.62 g.) and 5-acetanilidomethylene-3-ethylrhodanine (0.6 g.) are refluxed together in pyridine in the presence of triethylamine for 5 minutes. The reaction mixture is evaporated to dryness and extracted with ether. The dye is isolated from the ether solution by chromatography on silica gel followed by recrystallization from ethanol. The λmax of the product in methanol is 587 nm.

Yield: 0.045 g. (7%); Melting point: 178°–180° C

EXAMPLE 21

3'-Ethyl-10,10-dimethyl-9-phenyl-6-pyrido[1,2-a]indolothiacarbocyanine perchlorate

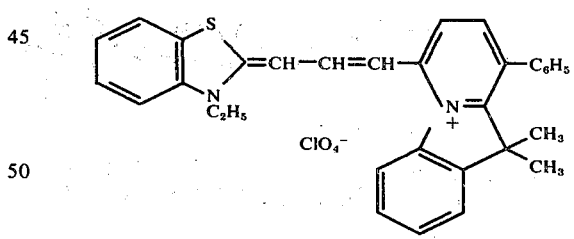

6,10,10-Trimethyl-9-phenylpyrido[1,2-a]indolium perchlorate (1 g.) and 2-[2-acetanilidovinyl]-3-ethyl-benzothiazolium perchlorate (1.1 g.) are dissolved in acetonitrile and treated with triethylamine. After 12 hours at room temperature, the reaction mixture is evaporated to dryness and recrystallized from methanol. After two recrystallizations from methanol, the λmax of the product in acetonitrile is 585 nm.

Yield: 0.5 g. (33%); Melting point: 267°–275° C

Analysis for $C_{32}H_{29}ClN_2O_4S$ — Calculated: C 67.1%; H 5.1%; N 4.9%. Found: C 67.1%; H 5.1%; N 4.8%.

EXAMPLE 22

1,3,3,10',10'-Pentamethyl-9'-phenylindo-6'-pyrido[1,2-a]indolocarbocyanine perchlorate

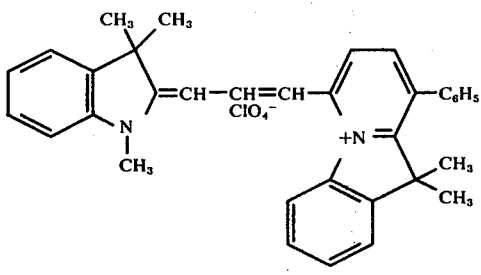

This dye is prepared in the manner described in Example 10 except that 2-[2-acetanilidovinyl]-1,3,3-trimethyl-3H-indolium perchlorate is used in place of the corresponding benzothiazolium derivative. After two recrystallizations from ethanol, the λmax of the product in acetonitrile is 557 nm.

Yield: 30%; Melting point: 272° C Analysis for $C_{34}H_{33}ClN_2O_4$ — Calculated: C 71.8%; H 5.9%; N 4.9%. Found: C 71.6%; H 6.1%; N 4.8%.

EXAMPLE 23

3-Ethyl-10',10'-dimethyl-9'-phenyloxa-6-pyrido[1,2-a]indolocarbocyanine perchlorate This dye is prepared according to the method described in Example 10 except that 2-[2-acetanilidovinyl]-3-ethylbenzoxazolium perchlorate is used in place of the corresponding benzothiazolium derivative. After recrystallization from acetonitrile, the λmax of the product in acetonitrile is 555 nm.

Yield: 33%; Melting point: 280°–283° C

EXAMPLE 24

3-Ethyl-5[(6,10-dihydro-10,10-dimethyl-9-phenyl-pyrido[1,2-a]indol-6-ylidene)ethylidene]rhodanine

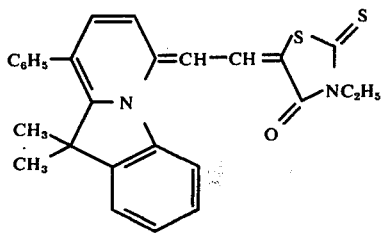

6,10,10-Trimethyl-9-phenylpyrido[1,2-a]indolium perchlorate (0.8 g.) and 5-acetanilidomethylene-3-ethylrhodanine (0.6 g.) are dissolved in acetonitrile and triethylamine is added. After 15 hours at room temperature, the dye is filtered off and recrystallized twice from ethanol. The λmax of the product in a mixture of pyridine and methyl alcohol is 590 nm.

Yield: 0.2 g. (21%); Melting point: 263° C

EXAMPLE 25

3-Ethyl-9',10',10'-trimethyl-oxa-6-pyrido[1,2-a]indolocarbocyanine perchlorate

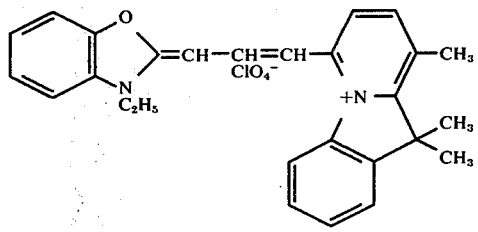

6,9,10,10-Tetramethylpyrido[1,2-a]indolium perchlorate (0.64 g.) and 2-[2-acetanilidovinyl]-3-ethylbenzoxazolium perchlorate (0.82 g.) are dissolved in acetonitrile. Triethylamine is added and the reaction mixture is allowed to stand at room temperature for 15 hours. The product is obtained by evaporation to dryness and recrystallization from methanol. The λmax of the product in acetonitrile is 543 nm.

Yield: 0.25 g. (25%); Melting point: 249°–250° C Analysis for $C_{27}H_{27}ClN_2O_5$ — Calculated: C 65.5%; H 5.5% N 5.7%. Found: C 65.4%; H 5.3% N 5.3%.

EXAMPLE 26

1,3,3,9',10',10'-Hexamethyl-indo-6'-pyrido[1,2-a]indolocarbocyanine perchlorate

This dye is prepared as described in Example 14 except that 2-[2-acetanilidovinyl]-1,3,3-trimethyl-3H-indolium perchlorate is used in place of the corresponding benzoxazolium derivative. After two recrystallizations from methanol, the λmax of the product in acetonitrile is 541 nm.

Yield: 40%; Melting point: 277° C

EXAMPLE 27

3'-Ethyl-9,10,10-trimethyl-6-pyrido[1,2-a]indolothiacarbocyanine perchlorate

This dye is prepared as described in Example 14 except that 2-[2-acetanilidovinyl]-3-ethylbenzothiazolium perchlorate is used in place of the corresponding benzoxazolium derivative. After two recrystallizations from methanol, the $\lambda_{max}$ of the product in acetonitrile is 570 nm.

Yield: 49%; Melting point: 240° C Analysis for $C_{27}H_{27}ClN_2O_4$ — Calculated: C 63.5%; H 5.3% N 5.5% Found: C 63.3%: H 5.6% N 5.3%.

EXAMPLE 28

3-Ethyl-5-[(6,10-dihydro-9,10,10-trimethylpyrido[1,2-a]indol-6-ylidene)ethylidene]rhodanine 6,9,10,10-Tetramethylpyrido[1,2-a]indolium perchlorate (0.64 g.) and 5-acetanilidomethylene-3-ethylrhodanine (0.61 g.) are dissolved in acetonitrile and tetramethylguanidine (0.2 g.) is added. After 6 hours at room temperature, the dye is filtered off and recrystallized from acetonitrile. The $\lambda_{max}$ of the product in a mixture of pyridine and methyl alcohol is 587 nm.

Yield: 0.2 g. (25%); Melting point: 235° C

EXAMPLE 29

1,3-Diethyl-5[(6,10-dihydro-10,10-dimethyl-pyrido[1,2-a]indol-6-ylidene)ethylidene]-2-thiobarbituric acid 6,10,10-Trimethylpyrido[1,2-a]indolium perchlorate (0.62 g.) and 5-anilinomethylene-1,3-diethyl-2-thiobarbituric acid (0.6 g.) are dissolved in acetonitrile. Tetramethylguanidine (0.23 g.) is added and the reaction mixture is stirred at room temperature overnight. The precipitated dye is filtered off and recrystallized from acetonitrile. The $\lambda_{max}$ of the product in a mixture of pyridine and methyl alcohol is 513 nm.

Yield: 0.35 g. (41%); Melting point: 290° C Analysis for $C_{24}H_{25}N_3O_2S$ — Calculated: C 68.7%; H 6.0%; N 10.0%. Found: C 68.6%; H 5.9%; N 10.1%.

EXAMPLE 30

1,3-Diethyl-5-[(6,10-dihydro-9,10,10-trimethyl-pyrido[1,2-a]indol-6-ylidene)ethylidene]-2-thiobarbituric acid This dye is prepared by the method of Example 18 except that 6,9,10,10-tetramethylpyrido[1,2-a]indolium perchlorate is used in place of the trimethyl derivative. The dye is purified by recrystallization from acetonitrile. The $\lambda_{max}$ of the product in a mixture of pyridine and methyl alcohol is 501 nm.

Yield: 35%; Melting point: 340° C

EXAMPLE 31

1,3,3,10',10'-Pentamethyl-indo-6'-pyrido[1,2-a]indolocarbocyanine perchlorate 6,10,10-Trimethylpyrido[1,2-a]indolium perchlorate (0.9 g.) and 2-(2-acetanilidovinyl)-1,3,3-trimethyl-3H-indolium perchlorate (1.2 g.) are dissolved in acetonitrile. Triethylamine is added and the reaction mixture is stirred at room temperature overnight. The dye is obtained by evaporation to dryness and recrystallization from ethanol. The $\lambda_{max}$ of the product in acetonitrile is 547 nm.

Yield: 0.6 g. (42%); Melting point: 266° C

EXAMPLE 32

3'-Ethyl-10,10-dimethyl-8-pyrido[1,2-a]indolothiacarbocyanine perchlorate

This dye is prepared by the method described in Example 10 except that 8,10,10-trimethylpyrido[1,2-a]indolium perchlorate is used in place of 6,10,10-trimethyl-9-phenylpyrido[1,2-a]indolium perchlorate. After recrystallization from ethanol, the $\lambda_{max}$ of the product in acetonitrile is 593 nm.

Yield: 48%; Melting point 168°–172° C

EXAMPLE 33

3-Ethyl-10',10'-dimethyl-oxa-8'-pyrido[1,2-a]indolocarbocyanine perchlorate

This dye is prepared by the method of Example 14 except that 8,10,10-trimethylpyrido[1,2-a]indolium perchlorate is used in place of 6,9,10,10-tetramethyl-pyrido[1,2-a]indolium perchlorate. The $\lambda_{max}$ of the product in acetonitrile is 560 nm.

Yield: 43%; Melting point: 218°–220° C

EXAMPLE 34

3'-Ethyl-10,10-dimethyl-8-pyrido[1,2-a]indolothiacyanine perchlorate 8,10,10-Trimethylpyrido[1,2-a]indolium perchlorate (0.6 g.) and 3-ethyl-2-phenylthiobenzothiazolium iodide (0.8 g.) are dissolved in pyridine (6 ml.). Triethylamine is added and the mixture is refluxed for 2 minutes. The cooled solution is diluted with ether and the isolated dye is purified by two recrystallizations from ethanol. The $\lambda_{max}$ of the product in acetonitrile is 482 nm.

Yield: 0.25 g. (27%); Melting point: 268°–270° C

EXAMPLE 35

3'-Ethyl-10,10-dimethyl-9-phenyl-4',5'-benzo-6-pyrido[1,2-a]indolothiacarbocyanine perchlorate 6,10,10-Trimethyl-9-phenylpyrido[1,2-a]indolium perchlorate (0.39 g.) and 2-(2-anilinovinyl)-1-ethyl-naphtho[1,2-d]thiazolium p-toluenesulfonate (0.5 g.) are dissolved in acetonitrile. Acetic anhydride and triethylamine are added and the reaction mixture is stirred at room temperature for 2 hours. After removal of the solvent, the dye is recrystallized from methanol. The $\lambda_{max}$ of the product in acetonitrile is 608 nm.

Yield: 0.15 g. (24%); Melting point: 285° C Analysis for $C_{36}H_{31}ClN_2O_4S$ — Calculated: C 69.4%; H 5.0%; N 4.5%. Found: C 69.6%; H 5.3%; N 4.2%.

EXAMPLE 36

3'-Ethyl-10,10-dimethyl-4',5'-benzo-6-pyrido[1,2-a]indolothiacarbocyanine perchlorate This dye is prepared by the method of Example 20 except that 6,10,10-trimethylpyrido[1,2-a]indolium perchlorate is used in place of the 9-phenyl derivative. The dye is purified by recrystallization from acetonitrile. The $\lambda_{max}$ of the product is 598 nm.

Yield: 5%; Melting point: 288° C

EXAMPLE 37

The dyes of Examples 17–36 are tested as described in Example 16. The results are shown in Table II.

TABLE II

| Dye of Example | Dye Conc. (mg/mole silver halide) | Sens max (nm) | Sens. Range (nm) |
| --- | --- | --- | --- |
| Control | 0 | — | 380–490 |
| 17 | 300 | 630 | 510–680 |
| 18 | 200 | 680 | 610–710 |
| 19 | 300 | 520 | 380–560 |
| 20 | 200 | 630 | 530–660 |
| Control | — | — | 390–490 |
| 17 | 300 | 630 | 500–680 |
| 18 | 356 | — | 600–720 |
| 20 | 220 | 640 | 500–670 |
| 21 | 510 | 640 | 500–690 |
| 22 | 306 | 630 | 500–670 |
| 23 | 300 | 600 | 500–660 |
| 24 | 243 | 640 | 500–740 |
| 25 | 300 | 590 | 500–640 |
| 26 | 500 | 600 | 500–670 |
| 27 | 300 | 640 | 500–690 |
| 28 | 100 | 640 | 500–670 |
| 29 | 500 | 560 | 390–600 |
| 30 | 333 | 550 | 380–600 |
| 31 | 300 | 600 | 500–650 |
| 32 | 100 | 635 | 530–690 |
| 33 | 385 | 550 | 500–640 |
| 34 | 380 | 520 | 490–550 |
| 35 | 333 | 670 | 500–720 |
| 36 | 341 | 660 | 520–720 |

EXAMPLE 38

3'-Ethyl-10,10-dimethyl-8-phenyl-6-pyrido[1,2-a]-indolothiacarbocyanine perchlorate

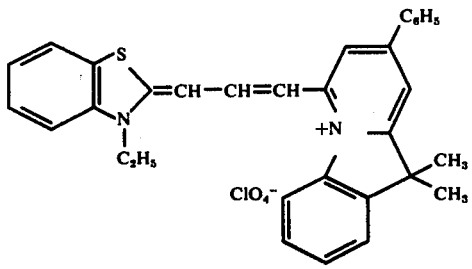

This dye is prepared by the method described in Example 19 except that 6,10,10-trimethyl-8-phenyl-pyrido[1,2-a]indolium perchlorate is used in place of the 9-phenyl derivative. After two recrystallizations from methanol the $\lambda_{max}$ of the product in acetonitrile is 590nm. Yield 43%; m.p. 259°–260° C.

Analysis calculated for $C_{32}H_{29}ClN_2O_4S$: C, 67.1; H, 5.1; N, 4.9. Found: C, 66.7; H, 5.5; N, 4.6%.

EXAMPLE 39

3-Ethyl-10',10'-dimethyl-8'-phenyloxa-6'-pyrido[1,2-a]-indolo carbocyanine perchlorate This dye is prepared in a manner similar to that of Example 38 except that 2-[2-acetanilidovinyl]-3-ethylbenzoxazolium perchlorate is used in place of the corresponding benzothiazolium derivative. After recrystallization from methanol the $\lambda_{max}$ of the product in acetonitrile is 560nm. Yield 40%; m.p. 262°.

EXAMPLE 40

3-Ethyl-5(6,10-dihydro-10,10-dimethyl-8-phenyl-pyrido[1,2-a]indol-6-ylidene)ethylidene rhodanine 6,10,10-Trimethyl-8-phenylpyrido[1,2-a]indolium perchlorate (0.79g) and 5-acetanilidomethylene-3-ethylrhodanine (0.61g) are dissolved in acetonitrile and tetramethylguanidine (0.21g) added. After three hours at room temperature the dye is filtered off. After two recrystallizations from acetonitrile the $\lambda_{max}$ of the product in acetonitrile is 593nm. Yield 0.35g (38%); m.p. 270°–272° C.

EXAMPLE 41

1,3-Diethyl-5[(6,10-dihydro-10,10-dimethyl-8-phenyl-pyrido[1,2-a]indol-6-ylidene)ethylidene]-thiobarbituric acid This dye is prepared by the method described in Example 40 except that 5-anilinomethyl-1,3-diethyl-2-thiobarbituric acid is used in place of the rhodanine derivative. After recrystallization from acetonitrile the $\lambda_{max}$ of the product in pyridine is 549nm. Yield 35%; m.p. >310°.

Analysis calculated for $C_{30}H_{29}N_3O_2S$: C, 72.7; H, 5.9; N, 8.5. Found: C, 72.3; H, 5.6; N, 8.3.

EXAMPLE 42

3'-Ethyl-10,10-dimethyl-8-p-methoxyphenyl-6-pyrido[1,2-a]indolothiacarbocyanine perchlorate

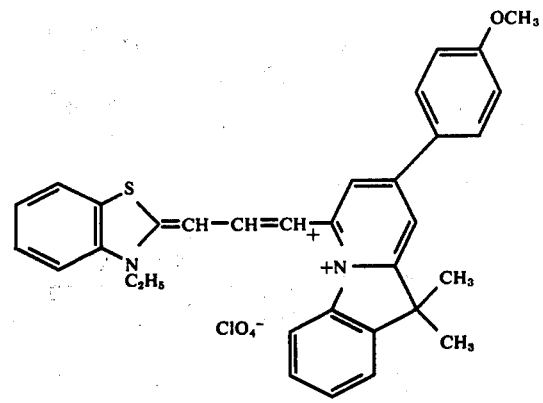

This dye is prepared by the method described in Example 8, except that 8-p-methoxyphenyl-6,10,10-trimethylpyrido[1,2-a]indolium perchlorate is used in place of 8-phenyl derivative. After purification by chromatography on silica gel the $\lambda_{max}$ of the dye in acetonitrile is 585nm. Yield 17%; m.p. 252°–253° C.

EXAMPLE 43

3-Ethyl-10',10'-dimethyl-8'-p-methoxyphenyloxa-6'-pyrido[1,2-a]indolo carbocyanine perchlorate This dye is prepared by the method described in Example 39, except that 8-p-methoxyphenyl-6,10,10-trimethylpyrido[1,2-a]-indolium perchlorate is used in place of the 8-phenyl derivative. After purification by chromatography on silica gel the $\lambda_{max}$ of the dye in acetonitrile is 557nm. Yield 17%; m.p. 259° C.

EXAMPLE 44

3-Ethyl-5[6,10-dihydro-10,10-dimethyl-8-p-methoxyphenylpyrido[1,2-a]indol-6-ylidene]ethylidene rhodanine This dye is prepared by the method described in Example 40, except that 8-p-methoxyphenyl-6,10,10-trimethyl pyrido[1,2-a]-indolium perchlorate is used in place of the 8-phenyl derivative. After recrystallization from acetonitrile the $\lambda_{max}$ of the product is 600nm in acetonitrile. Yield 19%; m.p. 210°–211° C.

EXAMPLE 45

1,3-Diethyl-5-[6,10-dihydro-10,10-dimethyl-8-p-methoxyphenylpyrido[1,2-a]indol-6-ylidene)ethylidene]thiobarbituric acid This dye is prepared by the method described in Example 41, except that 8-p-methoxy phenyl-6,10,10-trimethylpyrido[1,2-a]-indolium perchlorate is used in place of the 8-phenyl derivative. After recrystallization from dimethyl formamide the $\lambda_{max}$ of the product in pyridine is 547nm. Yield 29%; m.p. >310° C.

Analysis calculated for $C_{31}H_{31}N_3O_3S$: C, 70.8; H, 6.0; N, 8.0. Found: C, 70.9; H, 6.3; N, 7.9%.

EXAMPLE 46

3'-Ethyl-1,2-dihydro-3-pyrido[2,1-b]benzothiazolothiacyanine perchlorate

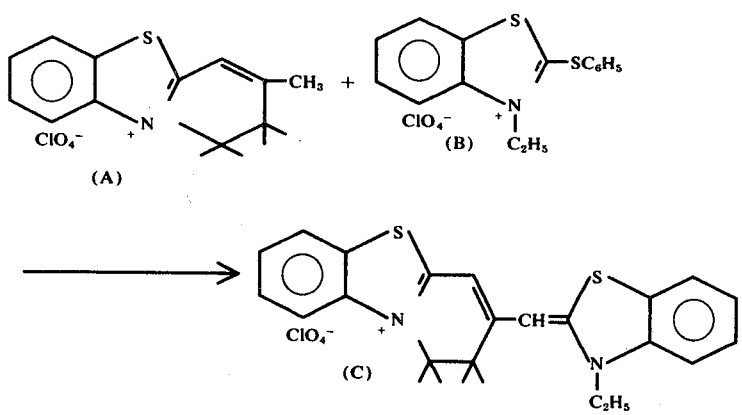

Compounds (A) (0.66g; 0.0022 mole) and (B) (0.74g; 0.002 mole) are dissolved in about 50ml of acetonitrile. Ethyl diisopropyl amine is added and the solution is refluxed for two minutes. The solution is poured into a stirred ether which causes the crude dye to separate. After 10 minutes it is collected by filtration and recrystallized from methanol to give 0.20g (21.6%) of (C); m.p. 207°–212°. $\lambda_{max}$ of the dye in methanol is 537.5 nm.

EXAMPLE 47

3'-Ethyl-3-pyrido[2,1-b]benzothiazolothiacarbocyanine perchlorate

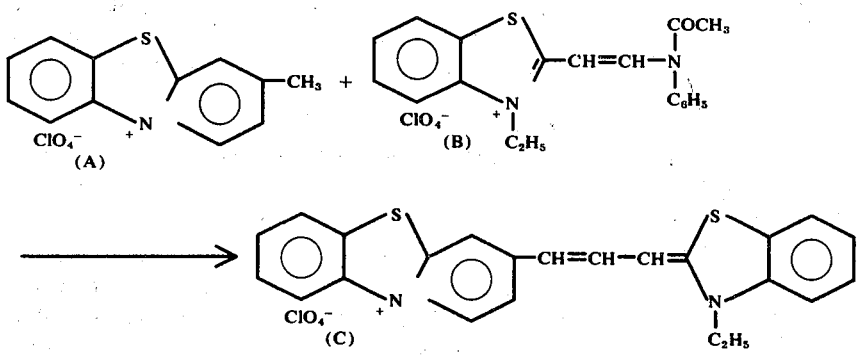

(A) (0.30g; 1 millimole) and (B) (0.42g; 1 millimole) are dissolved in about 35ml of acetonitrile. To the stirred solution is added (1,5-diazabicyclo[3,2.2] nonane) (5-fold excess) all at once. After about 15 seconds of stirring the solution is poured into 500ml of water containing a few grams of NaClO$_4$. The solution is stirred for about 5 minutes and filtered to give 0.32g. (65.7% of crude dye (C) containing a little symmetrical thiacarbocyanine. This crude dye is recrystallized from methanol (MeOH) containing a little dissolved NaClO$_4$ to give 0.25g of (C) (50.8%). A second recrystallization from MeOH (NaClO$_4$) gives 0.22g (45%); m.p. 273 d. $\lambda_{max}$ in methanol is 596 nm.

The following examples illustrate the preparation of dyes in accordance with this invention which feature an acenaphtho[1,2-d]thiazole nucleus fused to the 1,2-side of a pyrido or dihydropyrido nucleus, and the synthesis of intermediates useful in the preparation of such dyes.

EXAMPLE 48

2-Bromoacenaphthenone

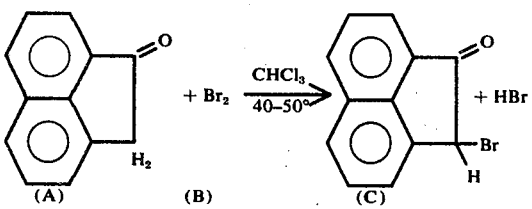

Compound (A) (6.72g; 0.04 mole) is dissolved in 100ml of chloroform (CHCl$_3$) and heated to 40 C. Bromine (6.4g; 0.04 mole) in 40ml of CHCl$_3$ is added dropwise to the solution of (A) at 40°–50° over 5 hours. After 3 more hours of stirring at 40°–50° the mixture is permitted to stir at room temperature overnight. The CHCl$_3$ is evaporated and the residue is taken up in ether. Cooling by evaporation causes solid (C) to separate which contains some unreacted (A) and some dibrominated product. Yield 9.1g (92%). The crude solid is recrystallized from ligroin to give a yellow powder containing only small amounts of (A) and dibrominated product. Yield 5.0g (50.7%); m.p. 100°–105°. Correct m.p. for pure is 112°.

EXAMPLE 49

8-Benzylacenaphtho[1,2-d]thiazole

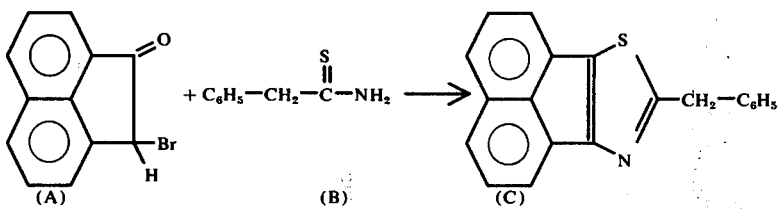

Compounds (A) (8.65g; 0.035 mole) and (B) (prepared as described in CA, 53722b, 1967) (5.3g; 0.035 mole) in 400ml of toluene are heated with stirring at 70°–80° C for 2 hours. During this time a solid separates. The solid is filtered, washed with toluene, and dried to give 9.73g of tan solid.

The solid is heated at 60°–80° C for 5 minutes in 20ml of concentrated $H_2SO_4$. The dark greenish-brown solution is added to 50ml of water, and the mixture is stirred with warming for about 30 minutes to induce the gummy material to crystalize. The solid is filtered and warmed in aqueous $Na_2CO_3$ solution. The free base is extracted with ether giving a deep yellow-brown solution. The ether is evaporated and the residue is taken up in warm methanol and filtered. Upon concentration and cooling the methanol solution the product (C) crystallizes. Yield 5.1g (48.7%); m.p. 98°–104°.

EXAMPLE 50

9-(2-Acetylethyl)-8-benzylacenaphtho[1,2-d]-thiazolium perchlorate

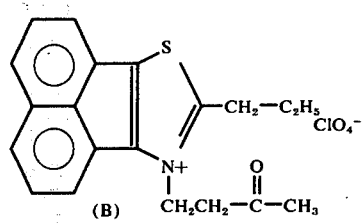

Compound (A) (4.8g; 0.016 mole) is dissolved in about 300ml of ether (cold), and 70% $HClO_4$ is added dropwise to the stirring solution until no more salt of (A) separates. The salt is filtered, washed with ether, and dissolved in about 180ml of dry MeCN (acetonitrile). About 10–15ml of MVK (methyl vinyl ketone) is added and the mixture is stirred at room temperature for 3 days. The solution is evaporated and the syrup is warmed with a little methanol. Upon cooling, concentration and scratching with a glass rod, the product becomes crystalline. The suspension is refrigerated overnight, filtered, the product washed first with a little methanol, then with ether, and dried to give 5.85g (78%) of yellow powder; m.p. 167°–169° d (crude).

EXAMPLE 51

1,2-Dihydro-3-methyl-4-phenylpyrido[2',1':8,9]-acenaphtho[1,2-d]thiazolium perchlorate

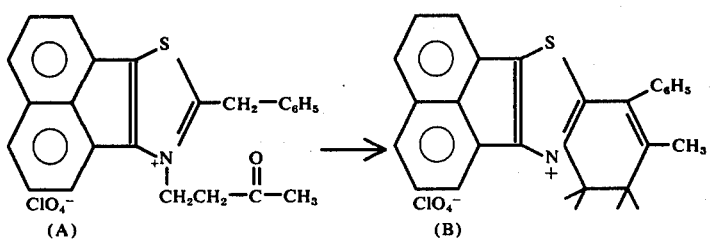

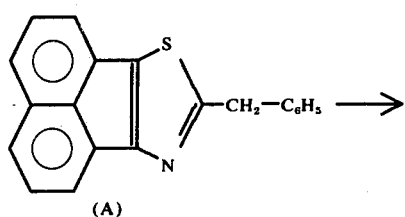

Compound (A) (4.70g; 0.01 mole) is dissolved in about 125ml of pyridine (blue solution) and boiled for a few minutes until the blue turns to yellow-brown. The pyridine is evaporated and the syrup is boiled with methanol until crystalline. The methanol mixture is concentrated to about 75ml, a little $NaClO_4$ is added, and the mixture is refrigerated. The crude (B) is filtered, washed in turn with methanol and ether, and dried to give 3.75g (83%); m.p. 243°–245° d.

EXAMPLE 52

3'-Ethyl-1,2-dihydro-4-phenyl-3-pyrido[2',1':8,9]-acenaphtho[1,2-d]thiazolothiacyanine perchlorate

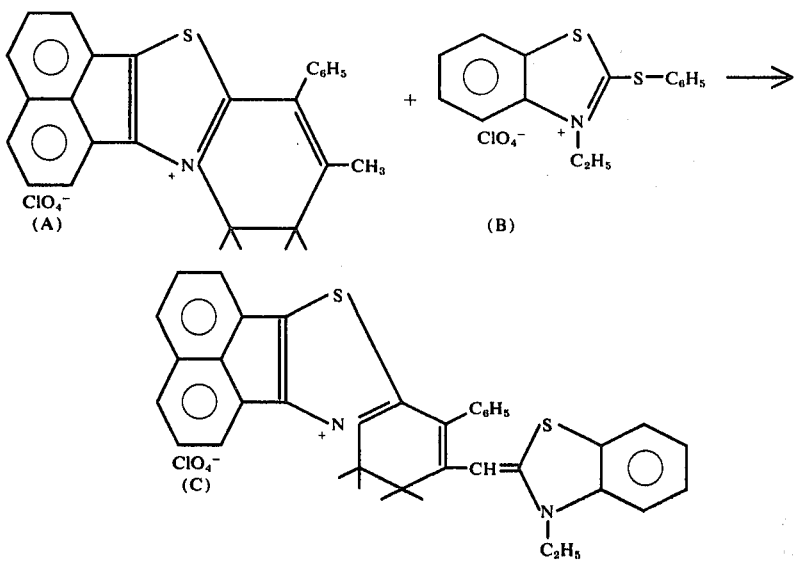

Compounds (A) (0.90g; 0.002 mole) and (B) (0.74g; 0.002 mole) are boiled for about 5 minutes in about 80ml of acetonitrile containing diisopropylethylamine (about 3mls, excess). The resulting mixture is poured into ether with stirring. After standing overnight the crude dye is filtered and washed with ether. Recrystallization from methanol containing a little dissolved NaClO$_4$ gives 0.63g of dye (C) (58.7%); a second recrystallization from methanol (+NaClO$_4$) gives 0.45g of (C) (41.9%); m.p. 203°–208°. $\lambda_{max}$ in methanol is 595 nm.

EXAMPLE 53

3-Methyl-4-phenylpyrido[2',1':8,9]acenaphtho[1,2-d]thiazolium perchlorate

Compound (A) (1.36g; 0.003 mole) is dissolved in about 20ml of DMA (dimethylacetamide) containing about ¼g of 10% palladium on charcoal. The mixture is refluxed for 30 minutes with stirring, filtered and poured into a liter of stirred ether. After an hour the solid is filtered to give 1.05g of crude (B). The filtrate is evaporated until the ether is removed, and the residual dimethylacetamide solution is poured into water containing some NaClO$_4$. After stirring 15 minutes the solid is filtered, washed with water, and then washed with ether to give an additional 0.10g of crude (B). Total crude yield is 1.15g (85.2%). The yellow solid is recrystallized from one liter of water to which a little Norite had been added. To induce crystallization some additional NaClO$_4$ is added to the filtered solution. Yield 0.62g (46%); m.p. about 151° (goes to a viscous glassy material).

EXAMPLE 54

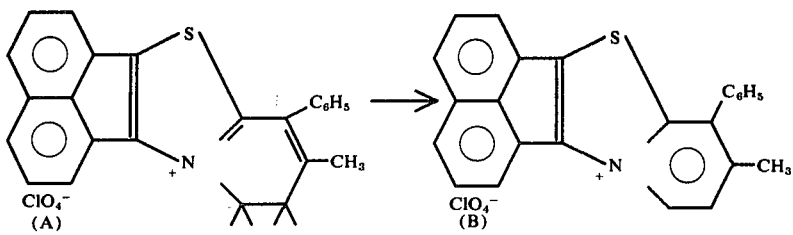

3'-Ethyl-4-phenyl-3-pyrido[2',1':8,9]acenaphtho-[1,2-d]thiazolothiacarbocyanine perchlorate

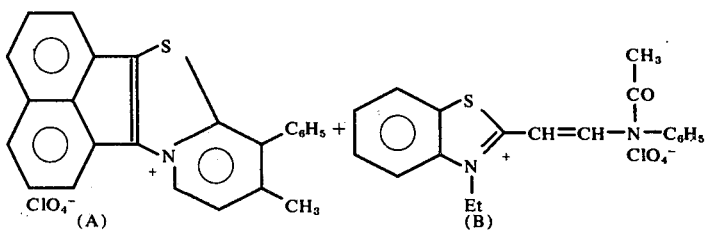

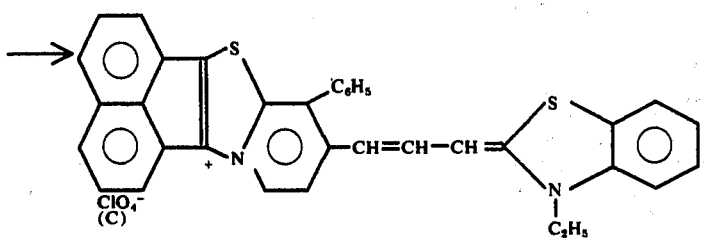

Compounds (A) (0.45g; 0.001 mole) and (B) (0.42g; 0.001 mole) are dissolved in 80ml of acetonitrile. To the stirring solution is added 7 drops of DBN (1,5-diazabicyclo[3.2.2]nonane) theoretical quantity = 0.125g. or about 5 drops. Stirring at room temperature is continued for 30 minutes as the product precipitates. The suspension is poured into about 800ml of stirred ether, and after a few minutes the crude product is filtered, washed with ether washed with water, washed with ether again, and dried to give 0.54g (84.8%) of crude (C). The dye is recrystallized by dissolving it in the minimum amount of hot methanol (2 parts) and acetonitrile (1 part) mixture and cooling the solution to give 0.41g (64.4%) of (C), m.p. about 307° d. $\lambda_{max}$ in methanol is 611 nm.

The following examples illustrate the preparation of dyes in accordance with this invention which feature a pyrido or dihydropyrido nucleus having fused on the 1,2-side thereof the atoms required to complete a benzimidazole nucleus, and the synthesis of intermediates useful in the preparation of such dyes.

EXAMPLE 55

4-Ethoxycarbonyl-3'-ethyl-5-phenyl-3-5H-pyrido[1,2-a]benzimidazolothiacarbocyanine perchlorate

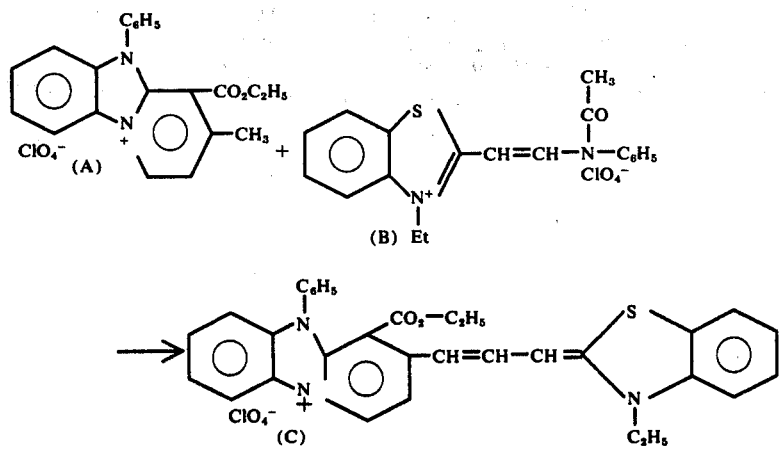

Compounds (A) (0.86g; 0.002 mole) and (B) (0.85g; 0.002 mole) are dissolved at room temperature in acetonitrile (MeCN). To the stirred solution is added an excess of 1,5-diazabicyclo[3.2.2]nonane. Dye forms at once. After stirring for 10 minutes the resulting mixture is poured into stirred ether (about 800ml). The crude dye is filtered after 10 minutes to give 0.8g (about 65%). The crude dye is recrystallized by dissolving it in a minimum amount of hot acetonitrile, adding ethanol and cooling the mixture to give 0.37g (30%). A second recrystallization from EtOH/MeCN gives 0.32g (26%); m.p. about 288° d; $\lambda_{max}$ in acetonitrile is 575 nm.

EXAMPLE 56

4-Ethoxycarbonyl-3'-ethyl-1,2-dihydro-5-phenyl-4',5'-benzo-3-5H-pyrido[1,2-a]benzimidazolothiacyanine perchlorate

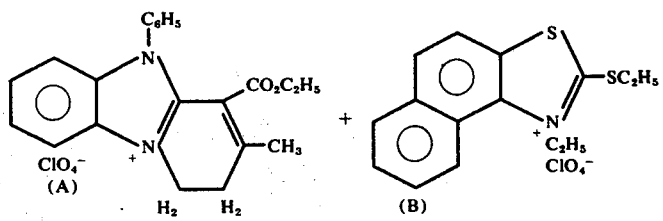

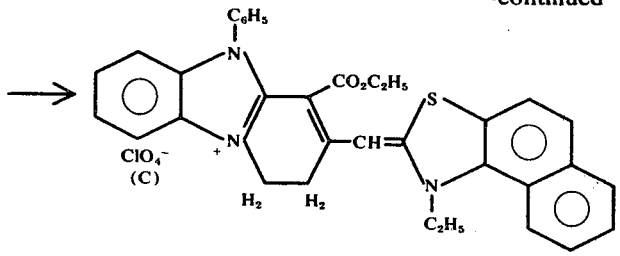

Compounds (A) (0.65g; 1.5 millimole) and (B) (0.61g; 1.65 millimole, 10% excess) are dissolved in 25ml of acetonitrile (MeCN), and diisopropylethylamine (12 drops, excess) is added at room temperature. Dye begins forming at once. The solution is heated to boiling and cooled; some dye separates. The solution is poured into about 700ml of stirred ether and, after stirring a few minutes the solid is filtered off, washed with water, then ether, and dried. Recrystallization from ethyl alcohol with a little MeCN gives 0.59g (61.2%) fine green crystals, m.p. 234°. $\lambda_{max}$ in acetonitrile is 517 nm.

Compounds (A) (0.86g; 0.002 mole) and (B) (0.85g; 0.002 mole) are refluxed in pyridine for 5 minutes. After cooling somewhat the dye solution is poured into 1 liter of stirred ether. After 30 minutes the ether is decanted and the crude dye is recrystallized from iso-propyl alcohol to give 0.9g (72.5%). A second recrystallization from iso-propyl alcohol gives 0.4g of purple black powder (32.3%). $\lambda_{max}$ in acetonitrile is 611 nm.

EXAMPLE 58

4-Ethoxycarbonyl-3'-ethyl-5-methyl-4',5'-benzo-3-5H-pyrido[1,2-a]benzimidazolothiacyanine perchlorate

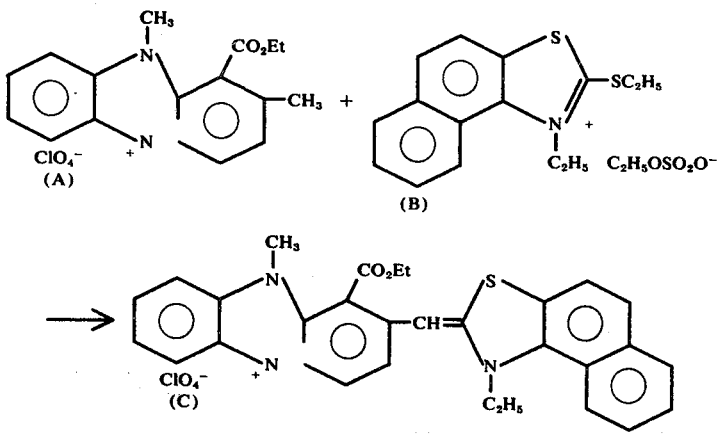

EXAMPLE 57

4-Ethoxycarbonyl-3'-ethyl-1,2-dihydro-5-phenyl-3-5H-pyrido[1,2-a]benzimidazolothiacarbocyanine perchlorate Compounds (A) (0.55g; 1.5 millimole) and (B) (.66g; 1.5 millimole) are dissolved in boiling acetonitrile (MeCN) and excess ethyl diisopropylamine is added. Dye forms at once and within 10 seconds begins to separate. The solution is boiled for 1 minute, cooled and filtered to give 0.60g crude dye. It is dissolved in

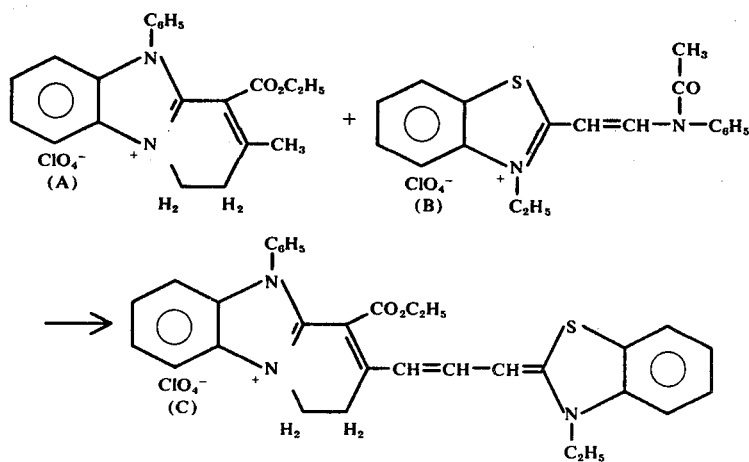

hot methanol (MeOH) and treated with a MeOH solution of NaClO$_4$. The dye perchlorate precipitates, is filtered, washed with MeOH and dried to give 0.51g (58.6%) crude (C). Recrystallization from a mixture of MeCN and MeOH gives 0.42g (48.3%); m.p. about 335° d. $\lambda_{max}$ in acetonitrile is 500 nm.

EXAMPLE 59

3-Ethyl-5[(1,2,3,5-tetrahydro-5-methyl-pyrido[1,2-a]benzimidazol-3-ylidene)ethylidene]rhodanine

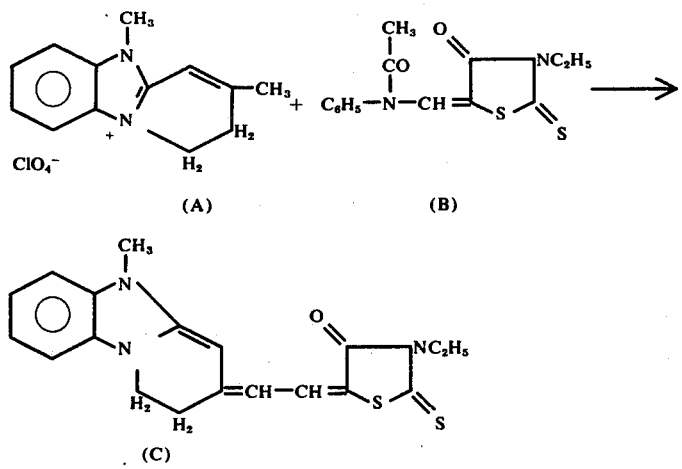

Compounds (A) (0.45g; 0.0015 mole) and (B) (0.46g; 0.0015 mole) in 30ml of stirred acetonitrile (MeCN) at room temperature are treated with tetramethylguanidine (0.20g, about 20% excess). After about 15 minutes the solvent is evaporated and the residue recrystallized from an MeCN-methanol solvent mixture to give 0.24g (43.4%) of a dark solid. The mixture was chromatographed on a column (Silica gel/Pyridine) and the front-running main dye retained. After evaporation of the pyridine the residue was recrystallized from MeCN to give 15mg (about 3%) of a dark powder, (C); m.p. 275°. $\lambda_{max}$ in acetonitrile is 604 nm.

EXAMPLE 60

4-Ethoxycarbonyl-3'-ethyl-5-methyl-1-5H-pyrido[1,2-a]benzimidazolothiacarbocyanine perchlorate

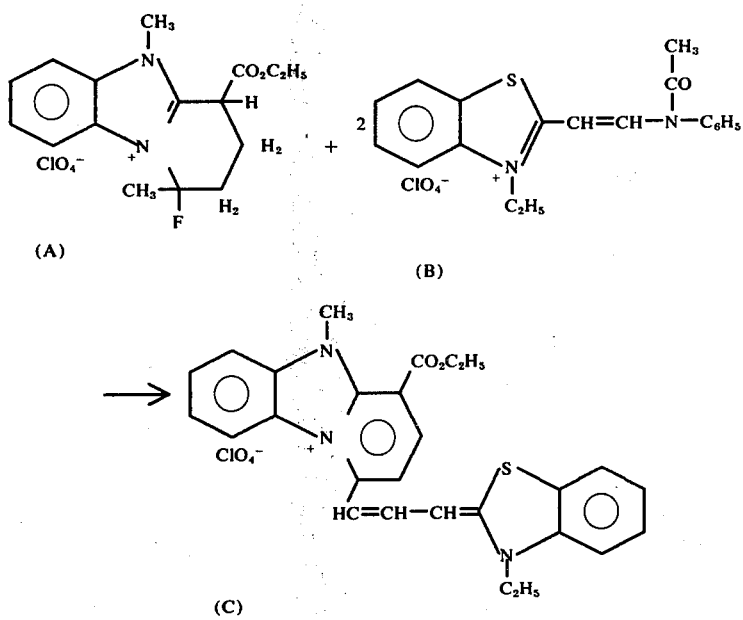

Compounds (A) (0.39g; 1 millimole; 100% excess) and (B) (0.42g; 1 millimole) in about 30ml of acetonitrile are treated with diisopropylethylamine (3–4ml, excess) at room temperature. The solution turns blue on standing at room temperature. After 24 hours, some of dye (c) separates. The entire mixture is poured into 700ml of ether and stirred for 24 hours. The fine green crystalline dye (C) is filtered and washed with ether to give 0.22g. Recrystallization from a mixture of methanol and MeCN, (about 100ml) containing some dissolved NaClO$_4$ gives fine matted green needles 0.18g. The filtrate is concentrated and cooled to give an additional 0.02g. Yield 0.20g (72% based upon (B)); m.p. 258°. $\lambda_{max}$ in methanol is 618 nm.

EXAMPLE 61

8-Chloro-3',5-diethyl-3-5H-pyrido[1,2-a]-benzimidazolothiacarbocyanine perchloriate

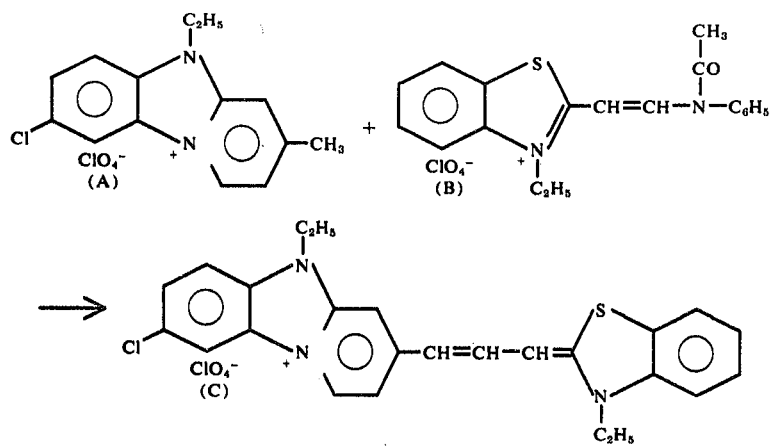

Compounds (A) (0.35g; 0.001 millimole) and (B) (0.46g; 0.0011 mole) in acetonitrile (MeCN) are heated to boiling with stirring and excess 1,5-diazabicyclo[3.2.2]nonane is added. Dye forms and after about a minute of boiling the solution is cooled and poured into 1 liter of stirred ether. After 15 minutes the crude dye is filtered and washed with H$_2$O, ethyl alcohol (EtOH) and ether to give 0.33g (62%). Recrystallization from an EtOH-MeCN mixture gives 0.20g (37.6%); m.p. 246°–251°. $\lambda_{max}$ in acetonitrile is 543 nm.

EXAMPLE 62

8-Chloro-4-ethoxycarbonyl-3',5-diethyl-1,2-dihydro-4',5'-benzo-3-5H-pyrido[1,2-a]-benzimidazolothiacyanine perchlorate

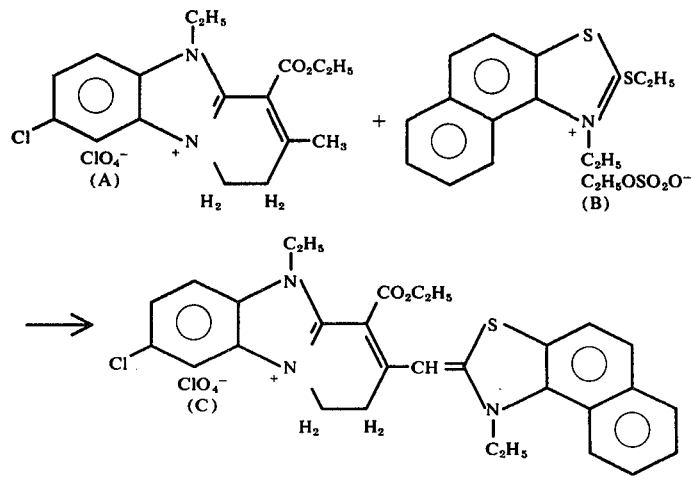

Compounds (A) (0.42g; 1 millimole) and (B) (0.48g; 1.1 millimole) are refluxed in pyridine for 1–2 minutes. The mixture is cooled and added to stirred ether. After 20 minutes the solid is filtered off, washed with water and then ether and dried to give 0.41g (65%) of crude (C). Recrystallization from methanol containing some dissolved NaClO$_4$, yields 0.155g of dye (24.6%) (C); m.p. 233°–235°. $\lambda_{max}$ in acetonitrile is 508 nm.

The following examples show the preparation of intermediates used in the preparation of the dyes described in Examples 55–62.

EXAMPLE 63

2-Ethoxycarbonylmethyl-1-phenylbenzimidazole

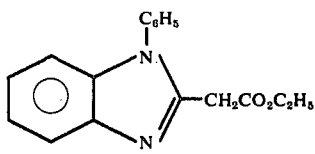

N-phenyl-o-phenylenediamine (55.27g; 0.3 mole) and carboethoxyacetimidate hydrochloride [Ber., 28, 478 (1895)](58.70g; 0.3 mole) are refluxed in ethanol (200ml) for 4 hours. The separated ammonium chloride is filtered from the hot solution. The filtrate is evaporated to a syrup which is taken up in chloroform and washed twice with water. After drying (MgSO$_4$), the chloroform is evaporated, ligroin is added, and crystallization slowly occurs. The solid is filtered and recrystallized from ligroine to give 50.3g (59.8%); m.p. 87°–89°; Lit. m.p. 89°–91° [J. Hetero. Chem., 3(3), 280 (1966)].

EXAMPLE 64

2-Ethoxycarbonylmethyl-1-methylbenzimidazole

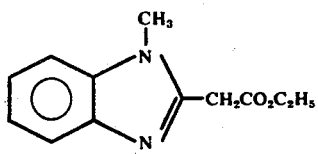

Prepared as in Example 63 from N-methyl-o-phenylenediamine to give 55.6% yield; m.p. 66°–67°.

EXAMPLE 65

5-Chloro-2-ethoxycarbonylmethyl-1-ethylbenzimidazole

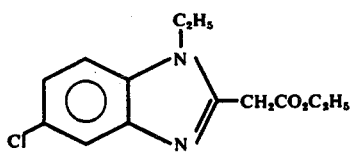

Prepared as in Example 63 from 5-chloro-2-ethylaminoaniline to give 66% yield; m.p. 44°–45°.

EXAMPLE 66

4-Ethoxycarbonyl-1,2-dihydro-3,5-dimethyl-5H-pyrido[1,2-a]benzimidazolium perchlorate

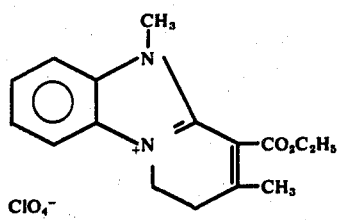

2-Ethoxycarbonylmethyl-1-methylbenzimidazole (32.8g; 0.15 mole) in stirred ether is treated with 70% perchloric acid until no more syrup separates. The ether is decanted, and the syrup washed twice with fresh ether. The syrup is dissolved in acetonitrile (250ml), dried (MgSO$_4$), and methylvinyl ketone (100ml, excess) is added. After stirring at room temperature for a week, the reaction mixture is evaporated, and the syrup boiled for two minutes in pyridine (200ml). The pyridine is evaporated, and the partially crystalline residue is treated with pure tetrahydrofuran. The product is filtered, washed and dried to give 19.2g (34.5%). A sample was recrystallized from ethanol m.p. 202°d.

Analysis Calculated for C$_{16}$H$_{19}$ClO$_6$N$_2$: C, 51.9; H, 5.17; Cl, 9.57; N, 7.55. Found: C, 51.9; H, 5.2; Cl, 9.8; N, 7.2.

EXAMPLE 67

4-Ethoxycarbonyl-1,2,3,4-tetrahydro-1-hydroxyl,5-dimethyl-5H-pyrido[1,2-a]benzimidazolium perchlorate

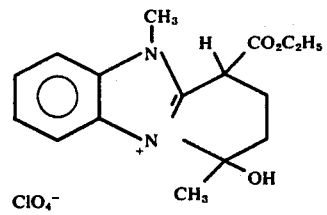

The filtrate from Example 66 above is evaporated and the residual syrup is boiled in ethyl acetate. The insoluble material is filtered off and recrystallized twice from acetic acid to give 12.3g (21.%) m.p. 119°–121°.

EXAMPLE 68

4-Ethoxycarbonyl-3,5-dimethyl-5H-pyrido[1,2-a]-benzimidazolium perchlorate

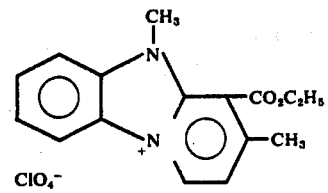

4-Ethoxycarbonyl-1,2-dihydro-3,5-dimethyl-5H-pyrido[1,2-a]benzimidazolium perchlorate (2.22g; 0.006 mole) is refluxed for an hour with stirring in (DMA) dimethylacetamide (40ml) containing (Pd/C) palladium on carbon (10%) (about .4g). The mixture is cooled, filtered, and poured into stirred ether. After an hour the solid is filtered, washed with ether, and dried to give 1.58g (71.5%). Recrystallized from ethanol to give 1.18g (53.5%); m.p. 242°–245° d.

EXAMPLE 69

1,2-Dihydro-3,5-dimethyl-5H-pyrido[1,2-a]-benzimidazolium perchlorate

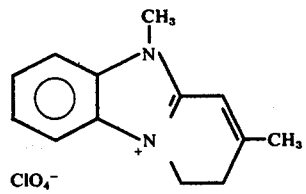

4-Ethoxycarbonyl-1,2-dihydro-3,5-dimethyl-5H-pyrido[1,2-a]benzimidazolium perchlorate (7.92g; 0.0213 mole) is boiled with stirring for 40 minutes in dimethylacetamide (50ml) containing concentrated HCl (3ml). During the reaction approximately half of the solution is allowed to boil away. The cooled reaction mixture is stirred overnight in a liter of ether. The ether is decanted and the residue is dissolved in hot water (300ml) and filtered. Upon cooling to room temperature some gummy material separates on the walls of the flask. The clear solution is decanted, cooled with an ice bath, and treated with 30g of sodium perchlorate. The crude product which separates is filtered, washed with a little water then ether, and recrystallized from ethanol to give 3.28g (51.6%); m.p. 206°–210° d.

EXAMPLE 70

3,5-Dimethyl-5H-pyrido[1,2-a]benzimidazolium perchlorate

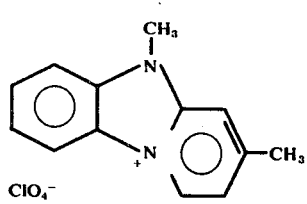

1,2-Dihydro-3,5-dimethyl-5H-pyrido[1,2-a]benzimidazolium perchlorate (2g; 0.0067 mole) is refluxed for an hour in stirring DMS (40ml) containing Pd/C (0.5g) in the manner described for the 4-ethoxycarbonyl compound. Recrystallization from ethanol gives 1.15g (58%); m.p. 240°–245° d.

The same material is also prepared from 4-ethoxycarbonyl-3,5-dimethyl-5H-pyrido[1,2-a]benzimidazolium perchlorate by boiling in DMA containing HCl as described for the 1,2-dihydro compound.

EXAMPLE 71

4-Ethoxycarbonyl-1-fluoro-1,2,3,4-tetrahydro1,5-dimethyl-5H-pyrido[1,2-a]benzimidazolium perchlorate

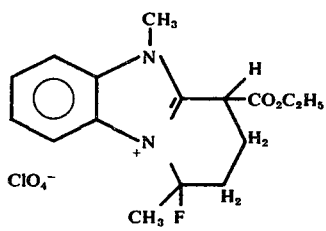

To 4-ethoxycarbonyl-1,2,3,4-tetrahydro-1-hydroxy1,5-dimethyl-5H-pyrido[1,2-a]benzimidazolium perchlorate (1.94g; 0.005 mole) in a vented polyethylene bottle is added liquid HF (about 50ml). After 3 days the solution is poured into an open polyethylene vessel in the hood and the HF evaporated. The resulting syrup is taken up in a little acetic acid and flooded with ether. The syrupy material gradually crystallizes after treatment with several portions of ether. The product is recrystallized from a mixture of isopropyl alcohol and p-dioxane to give 0.83g (42.5%); m.p. 138°–143°.

Calculated for $C_{16}H_{20}ClFN_2O_6$: C, 49.2; H, 5.15; Cl, 9.08; F, 4.86; N, 7.17. Found: C, 49.5; H, 5.4; Cl, 9.2; F, 4.9; N, 7.1.

EXAMPLE 72

4-Ethoxycarbonyl-1,2-dihydro-3-methyl-5-phenyl-5H-pyrido[1,2-a]benzimidazolium perchlorate

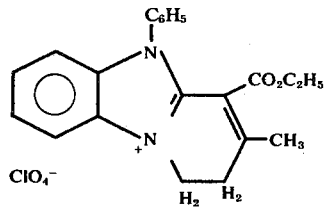

This intermediate is prepared from 2-ethoxycarbonylmethyl-1-phenylbenzimidazole (14.02g; 0.05 mole) via the procedure used to prepare the 5-methyl derivative to give 8.86g (41%); m.p. 212°–214°.

Calculated for $C_{21}H_{21}ClO_6N_2$: C, 58.3; H, 4.9, Cl, 8.2; N, 6.5. Found: C, 58.6; H, 4.9, Cl, 8.2, N, 6.5.

EXAMPLE 73

4-Ethoxycarbonyl-3-methyl-5-phenyl-5H-pyrido-[1,2-a]benzimidazolium perchlorate

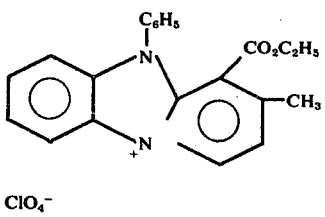

This intermediate is prepared from the above material (4.33g; 0.01 mole) by refluxing in DMA with Pd/C as previously described to give from ethanol 2.14g (49.7%); m.p. 230°–232° d.

EXAMPLE 74

8-Chloro-4-ethoxycarbonyl-5-ethyl-1,2-dihydro-3-methyl-5H-pyrido[1,2-a]benzimidazolium perchlorate

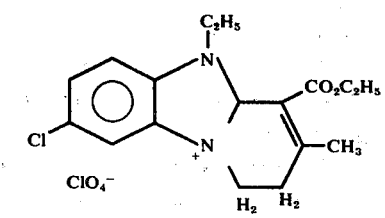

This intermediate is prepared from 5-chloro-2-ethoxycarbonylmethyl-1-ethylbenzimidazole (32.01g; 0.12 mole) via the procedure used to prepare the 5-methyl derivative to give after recrystallization from an ethanol-acetonitrile mixture 12.8g (25.5%); m.p. 232°–233° d.

Calculated for $C_{17}H_{20}Cl_2N_2O_6$: C, 48.8; H, 4.8; Cl, 16.9; N, 6.7. Found: C, 48.4; H, 4.8; Cl, 16.6; N, 6.7.

EXAMPLE 75

8-Chloro-5-ethyl-3-methyl-5H-pyrido[1,2-a]-benzimidazolium perchlorate and
5-Ethyl-3-methyl-5H-pyrido[1,2-a]benzimidazolium perchlorate X = H, Cl

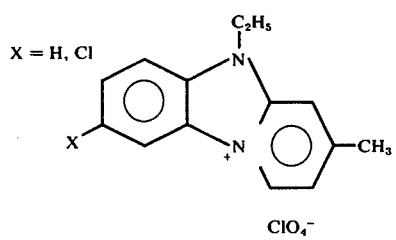

This mixture is obtained when the above material is refluxed in DMA with Pd/C as previously described. Evidently, hydrogen obtained from the aromatization partially hydrogenizes the carbon-chlorine bond giving HCl which promotes loss of the ester group.

EXAMPLE 76

The dyes of Examples 38-62 are tested as described in Example 16. The results are shown in Table III.

TABLE III

| Dye of Example | Dye conc. (mole/mole silver) | Sens. max (nm) | Sens. Range (nm) |
|---|---|---|---|
| Control | 0 | — | 380–500 |
| 46 | $2.16 \times 10^{-4}$ | 580 | 500–620 |
| 47 | $2.05 \times 10^{-4}$ | 640 | 540–690 |
| 52 | $4.87 \times 10^{-4}$ | 640 | 560–660 |
| 54 | $4.62 \times 10^{-4}$ | 675 | 550–710 |
| 38 | $2.0 \times 10^{-4}$ | 640 | 500–700 |
| 39 | $2.0 \times 10^{-4}$ | 610 | 500–680 |
| 40 | $6.0 \times 10^{-4}$ | 640 | 500–700 |
| 41 | $6.0 \times 10^{-4}$ | 570 | 500–620 |
| 42 | $6.0 \times 10^{-4}$ | 640 | 500–710 |
| 43 | $6.0 \times 10^{-4}$ | 600 | 500–680 |
| 44 | $8.0 \times 10^{-4}$ | 640 | 500–700 |
| 45 | $8.0 \times 10^{-4}$ | 565 | 500–630 |
| 55 | $2.0 \times 10^{-4}$ | 620 | 500–680 |
| 57 | $6.0 \times 10^{-4}$ | 650 | 520–730 |
| 58 | $8.0 \times 10^{-4}$ | 540 | 500–600 |
| 61 | $2.0 \times 10^{-4}$ | 595 | 500–660 |
| 62 | $6.0 \times 10^{-4}$ | 550 | 500–610 |

EXAMPLE 77

3-Methyl-1,4-diphenylpyrido[2,1-b]benzothiazolium perchlorate

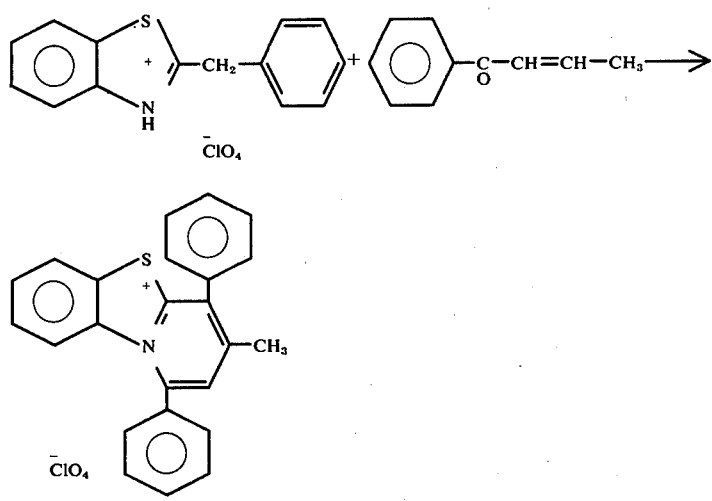

2Benzylbenzothiazolium perchlorate (5 g) and crotonophenone (10 ml) are heated at 70° for 1 day and then at 120° for 30 minutes. After cooling, the black mass is treated with ether and the ether extracts are decanted. The residue could be used for subsequent dye forming reactions. A one gram portion is purified by chromatography and the identity of the product confirmed by nuclear magnetic resonance spectroscopy.

EXAMPLE 78

3'-Ethyl-1,4-diphenyl-3-pyrido[2,1-b]benzothiazolo-thiacarbocyanine perchlorate

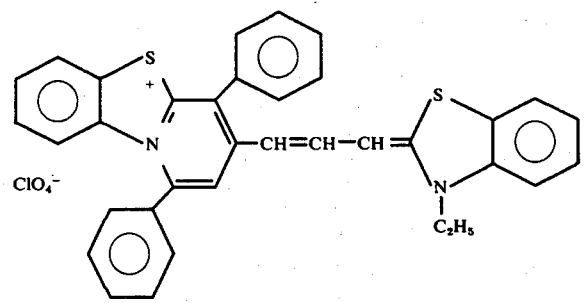

3-Methyl-1,4-diphenylpyrido[2,1-b]benzothiazolium perchlorate (0.5 g) and 2-2-acetanilidovinyl-3-ethylbenzothiazolium perchlorate (0.47 g) are suspended in acetonitrile. Triethylamine (2 ml) is added and the reaction mixture is refluxed 30 minutes. The solvent is removed under reduced pressure and the residue is recrystallized from ethylalcohol. Yield 0.20 g (41%) m.p. 272° $\lambda_{max}$ (acetonitrile) 605 nm $\epsilon$= 12.8 × 10$^4$.

Analysis for $C_{35}H_{27}ClN_2O_4S_2$ — Calculated: C 65.8%; H 4.2%; N 4.4% found: C 65.4%; H 4.4% N 4.1%.

EXAMPLE 79

1,2-Dihydro-8-methoxy-1,1,3-trimethylpyrido[2,1-b]-benzothiazolium perchlorate

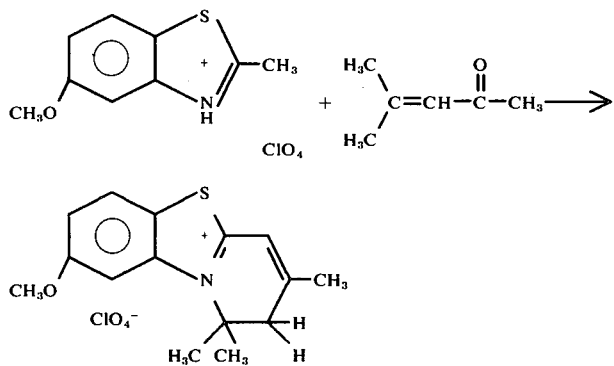

5-Methoxy-2-methylbenzothiazolium perchlorate (9 g) and mesityloxide (40 ml) are refluxed together for three days. The reaction mixture is poured into ether. The solid which separates is removed by filtration and dried. It is used without purification for subsequent dye forming reactions.

EXAMPLE 80

3'-Ethyl-1,2-dihydro-8-methoxy-1,1,1-dimethyl-pyrido[2,1-b]benzothiazolothiacarbocyanine perchlorate

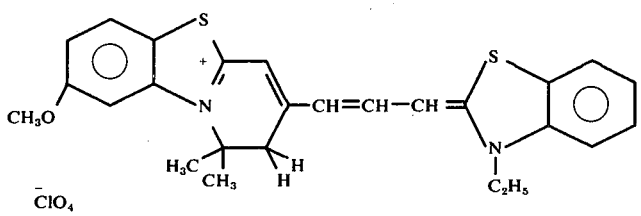

1,2-Dihydro-8-methoxy-1,1,3-trimethylpyrido[2,1-b]benzothiazolium perchlorate (2 g) (product prepared as described in Example 79) and 2-(2-acetanilidovinyl)-3-ethylbenzothiazolium perchlorate (2 g) is suspended in acetonitrile (30 ml). Triethylamine (5 ml) is added and the reaction mixture is refluxed for 2 minutes. It is poured into ether. The solid which separates is recrystallized from ethylalcohol/2-butanone. It is chromatographed on a silica gel - celite column using chloroform as solvent. The yield of pure dye is 600 milligrams (8.5%) $\lambda_{max}$ (acetonitrile) 660 nm. $\epsilon$=18.2 × 10$^4$.

The invention has been described in detail with particular reference to certain preferred embodiments thereof, but it will be understood that variations and modifications can be effected within the spirit and scope of the invention.

We claim:

1. A photographic silver halide composition containing at least one dye selected from those having the formulas

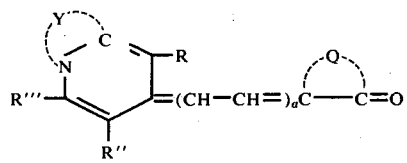

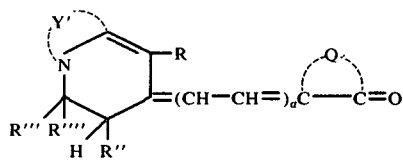

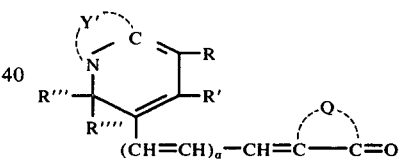

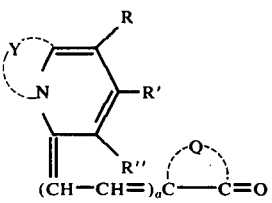

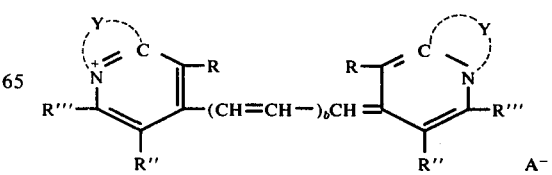

-continued

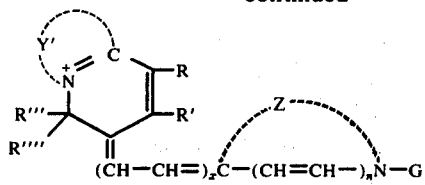

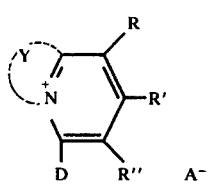

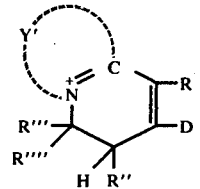

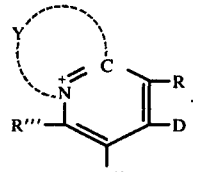

A⁻ and

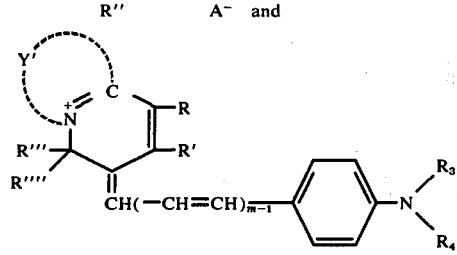

wherein:
Y represents the nonmetallic atoms necessary to complete a heterocyclic ring, said heterocyclic ring selected from the class consisting of an indole nucleus, a thiazole nucleus, an oxazole nucleus, an imidazole nucleus, or a selenazole nucleus;

R' represents the nonmetallic atoms necessary to complete a heterocyclic ring, said heterocyclic ring selected from the class consisting of a thiazole nucleus, an oxazole nucleus, an imidazole nucleus or a selenazole nucleus;

R, R', R'' and R''' each represents hydrogen, an alkyl group of 1 to 8 carbon atoms, an aryl group of 6 to 20 carbon atoms provided that when the ring system is represented by Y', R can also represent an alkoxy group of 1 to 8 carbon atoms or an aryloxy group having from 6 to 20 carbon atoms, and when Y and Y' represent the atoms required to complete a benzimidazole nucleus R, can also represent an alkoxycarbonyl group of 3 to 12 carbon atoms;

R'''' represents hydrogen or an alkyl group of 1 to 8 carbon atoms;

$a$ has a value of 1 or 2;

Q represents the nonmetallic atoms necessary to complete a heterocyclic nucleus containing 5 or 6 atoms in the heterocyclic ring;

A⁻ represents an anionic group;

$b$ has a value of 1, 2 or 3;

$x$ has a value of 0, 1, 2 or 3;

$n$ is 0 or 1;

Z represents the nonmetallic atoms necessary to complete a heterocyclic nucleus containing 5 or 6 atoms in the heterocyclic ring;

G represents a lower alkyl group, an aryl group, or an alkenyl group;

D represents a group having one of the following formulas

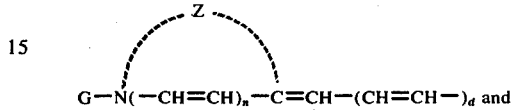

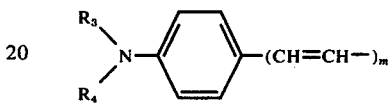

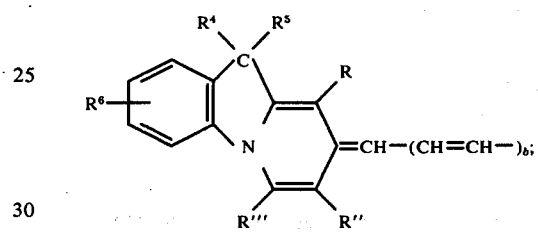

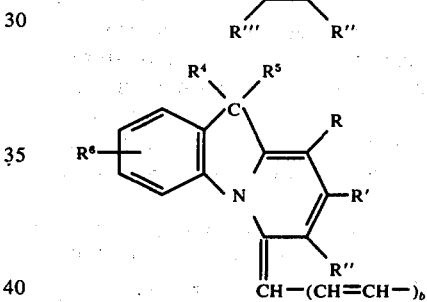

wherein:
$n$, Z, R, R', R'', R''' and G are as previously defined; $d$ and $b$ has a value of 0, 1, 2 or 3; m is 1 or 2;
$R_3$ and $R_4$ each represents a lower alkyl group;
$R^4$ and $R^5$ each represents a lower alkyl or cycloalkyl group; and,
$R^6$ represents hydrogen a lower alkyl group, cyano, a lower alkoxy group, an aryl group of 6 to 20 carbon atoms, a halogen or a nitro group.

2. A photographic silver halide composition as defined in claim 1 wherein said Y represents the atoms required to complete a ring selected from the group consisting of an indole ring, a benzothiazole ring, and a benzoxazole ring.

3. A photographic silver halide emulsion spectrally sensitized with a sensitizing dye selected from those having the formulas:

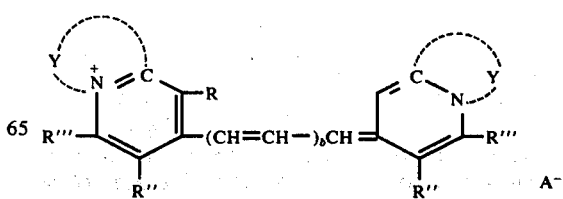

-continued

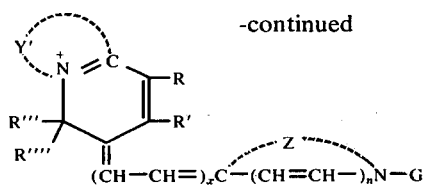

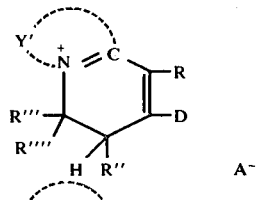

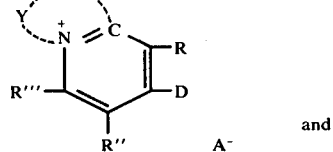

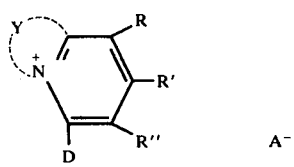

wherein:
Y represents the atoms required to complete a ring selected from the group consisting of a benzothiazole ring, an indole ring, an imidazole ring and a benzoxazole ring;
Y' represents the nonmetallic atoms necessary to complete a thiazole nucleus, an oxazole nucleus or an imidazole nucleus;
R, R', R'' and R''' each represents hydrogen, an alkyl group or an aryl group and R can additionally be an alkoxy group or an aryloxy group;
R'''' represents hydrogen or an alkyl group of 1 to 8 carbon atoms;
A⁻ represents an anionic group;
b has a value of 1, 2 or 3;
x has a value of 0, 1, 2 or 3; n is 0 or 1;
Z represents the nonmetallic atoms necessary to complete a heterocyclic nucleus containing 5 or 6 atoms in the heterocyclic ring;
G represents a lower alkyl group, an aryl group, or an alkenyl group;
D represents a group having one of the following formulas:

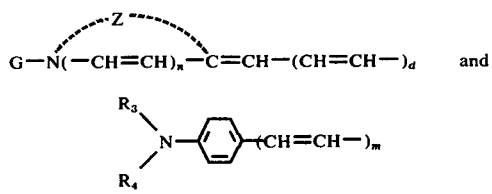

n, Z and G are as previously defined;
d has a value of 0, 1, 2 or 3; m is 1 or 2; and
R₃ and R₄ each represents a lower alkyl group.
4. A photographic silver halide emulsion spectrally sensitized with a sensitizing dye selected from those having one of the following formulas:

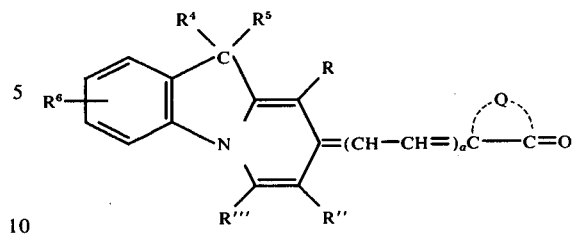

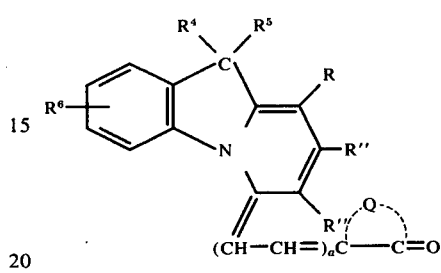

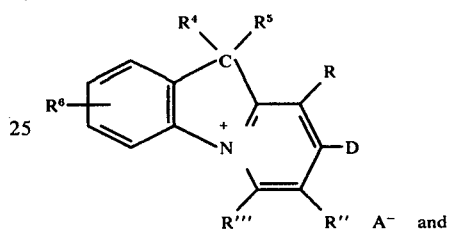

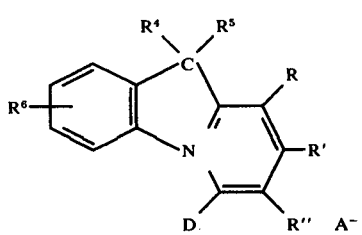

wherein:
R, R', R'' and R''' each represents hydrogen, an alkyl group of 1 to 8 carbon atoms or an aryl group of 6 to 20 carbon atoms and R can also be an alkoxy or aryloxy group;
R⁴ and R⁵ each represents an alkyl group or, taken together, the atoms necessary to complete a cycloalkyl group;
R⁶ represents hydrogen, a lower alkyl group, an alkoxy group, an aryl group of 6 to 20 carbon atoms, a nitro group or halogen;
Q represents the nonmetallic atoms necessary to complete a heterocyclic nucleus containing 5 or 6 atoms in the heterocyclic ring;
A⁻ represents an anionic group;
a represents 0, 1 or 2; and,
D represents one of the following groups:

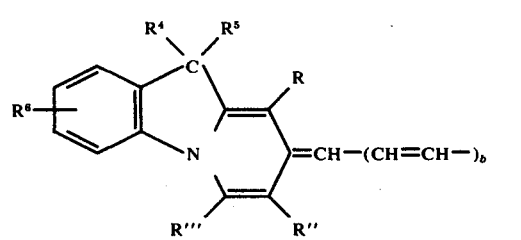

-continued

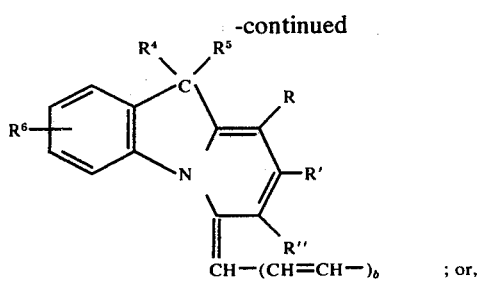
; or,

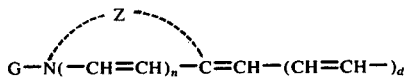

wherein:

R, R', R'' and R''', R⁴, R⁵ and R⁶ have the meanings given above;

G represents a lower alkyl group, an aryl group, or an alkenyl group;

b and d represent a value of 0, 1, 2 or 3; and,

Z represents the nonmetallic atoms necessary to complete a heterocyclic nucleus containing 5 or 6 atoms in the heterocyclic ring.

5. A photographic silver halide composition containing at least one dye selected from those having the formulas

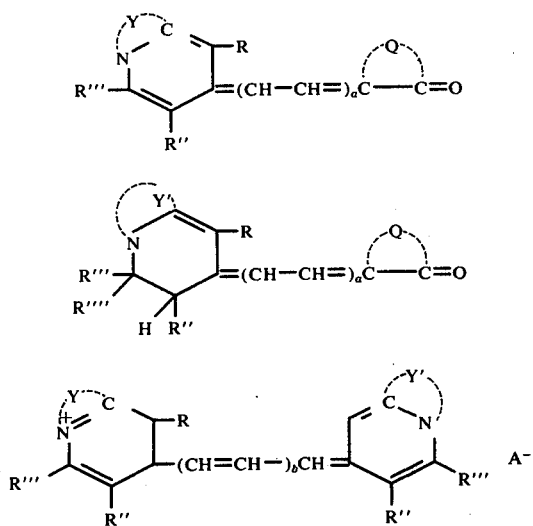

and

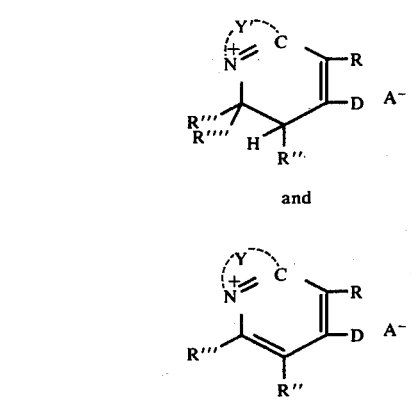

wherein:

Y represents the nonmetallic atoms necessary to complete a heterocyclic nucleus selected from the class consisting of an indole nucleus, a thiazole nucleus, an oxazole nucleus, an imidazole nucleus, or a selenazole nucleus;

Y' represents the nonmetallatic atoms necessary to complete a heterocyclic nucleus selected from the class consisting of a thiazole nucleus, an oxazole nucleus, an imidazole nucleus or a selenazole nucleus; R, R'' and R''' each represents hydrogen, an alkyl group of 1 to 8 carbon atoms, an aryl group of 6 to 20 carbon atoms provided that when the heterocyclic nucleus is represented by Y', R can also represent an alkoxy group of 1 to 8 carbon toms or an aryloxy group having from 6 to 20 carbon atoms, and when Y and Y'' represent the atoms required to complete a benzimidazole nucleus, R can also represent an alkoxycarbonyl group of 3 to 12 carbon atoms;

R'''' represents hydrogen or an alkyl group of 1 to 8 carbon atoms;

a has a value of 1 or 2;

Q represents the nonmetallic atoms necessary to complete a heterocyclic nucleus containing 5 or 6 atoms in the heterocyclic ring;

A⁻ represents an anionic group;

b has a value of 1, 2 or 3;

D represents a group having one of the following formulas

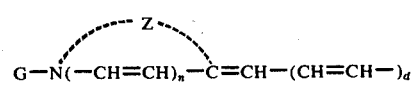

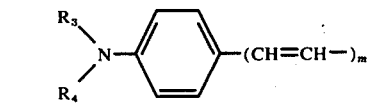

and

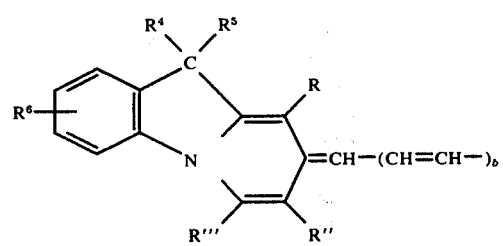

wherein:

R, R'' and R''' are as previously defined;

n is 0 or 1;

d and b have a value of 0, 1, 2 or 3; m is 1 or 2;

Z represents the nonmetallic atoms necessary to complete a heterocyclic nucleus containing 5 or 6 atoms in the heterocyclic ring;

G represents a lower alkyl group, an aryl group, or an alkenyl group;

$R_3$ and $R_4$ each represents a lower alkyl group;

R⁴ and R⁵ each represents a lower alkyl or cycloalkyl group; and,

R⁶ represents hydrogen, a lower alkyl group, cyano, a lower alkoxy group, an aryl group of 6 to 20 carbon atoms, a halogen or a nitro group.

6. A photographic silver halide emulsion spectrally sensitized with a sensitizing dye selected from those having the formulas:

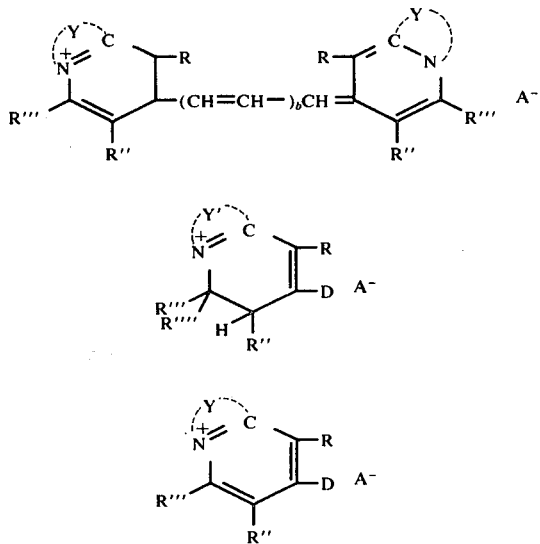

wherein:

Y represents the atoms required to complete a benzothiazole nucleus, an indole nucleus, an imidazole nucleus or a benzoxazole nucleus;

Y' represents the nonmetallic atoms necessary to complete a thiazole nucleus, an oxazole nucleus or an imidazole nucleus;

R, R'' and R''' each represents hydrogen, an alkyl group or an aryl group and R can additionally be an alkoxy group or an aryloxy group;

R'''' represents hydrogen or an alkyl group of 1 to 8 carbon atoms;

A⁻ represents an anionic group;

b has a value of 1, 2 or 3;

n is 0 or 1;

D represents a group having one of the following formulas:

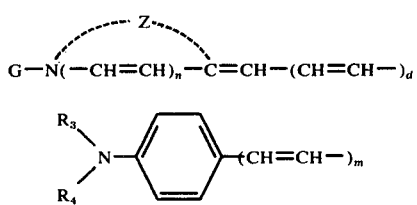

n is as previously defined;

d has a value of 0, 1, 2 or 3; m is 1 or 2;

Z represents the nonmetallic atoms necessary to complete a heterocyclic nucleus containing 5 or 6 atoms in the heterocyclic ring;

G represents a lower alkyl group, an aryl group, or an alkenyl group; and

R₃ and R₄ each represents a lower alkyl group.

7. A photographic silver halide emulsion as defined in claim 1 wherein said sensitizing dye is 4,4'-diphenyl-3,3'-pyrido[2,1-b]benzothiazolocarbocyanine salt.

8. A photographic silver halide emulsion as defined in claim 1 wherein said sensitizing dye is 3'-ethyl-4,8-diphenyl-3-pyrido[2,1-b]benzoxazolooxacarbocyanaine salt.

9. A photographic silver halide composition as defined in claim 1 wherein said sensitizing dye is 3'-ethyl-4,8-diphenyl3-pyrido[2,1-b]benzoxazolothiacarbocyanine salt.

10. A photographic silver halide composition as defined in claim 1 wherein said sensitizing dye is 3'-ethyl-4,8-diphenyl4',5'-benzo-3-pyrido[2,1-b]benzoxazolothiacarbocyanine salt.

11. A photographic silver halide composition as defined in claim 1 wherein aid sensitizing dye is anhydro-4,',8'-diphenyl-3-sulfopropyloxa-3'-pyrido[2,1-b]benzoxazolocarbocyanine hydroxide.

12. A photographic silver halide composition containing a dye selected from the group consisting of
   3'-ethyl-4-phenyl-3-pyrido[2,1-b]benzothiazolothiacyanine salt;
   1,3-diallyl-1',2'-dihydro-4'-phenyl-1H-imidazo[4,5-b]-quinoxalino-3-pyrido[2,1-b]benzothiazolocarbocyanine salt;
   2-(3-ethyl-2-benzothiazolinylidene)-1,2-dihydro-4-phenylpyrido[2,1-b]benzothiazolium salt;
   3'-ethyl-4,8-diphenyl-3-pyrido[2,1-b]benzoxazolothiacarbocyanine salt;
   3', 5-diethyl-4-phenyl-3(5H)-pyrido[1',2':1,2]imidzo[4,5-b]quinoxalinothiacyanine salt, and
   3'5-diethyl-4-phenyl-3(5H)-pyrido 1', 2':1,2]imidazo[4,5-b]quinoxalinothiacarbocyanine salt.

13. A photographic silver halide composition as defined in claim 4 wherein said dye has the formula:

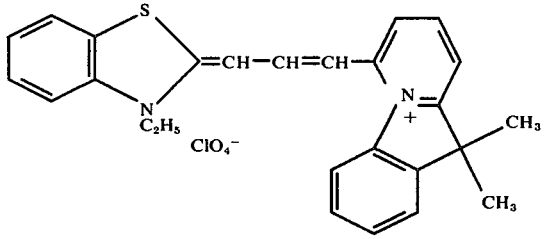

14. A photographic silver halide emulsion as defined in claim 4 wherein said dye has the formula:

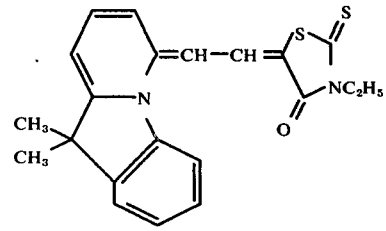

15. A photographic silver halide emulsion as defined in claim 4 wherein said dye has the formula:

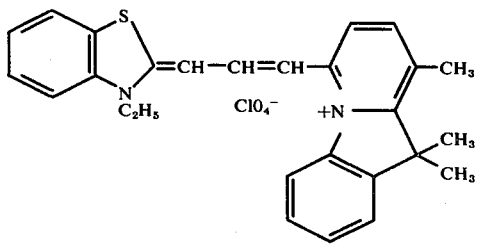

16. A photographic silver halide emulsion as defined in claim 4 wherein said dye has the formula:

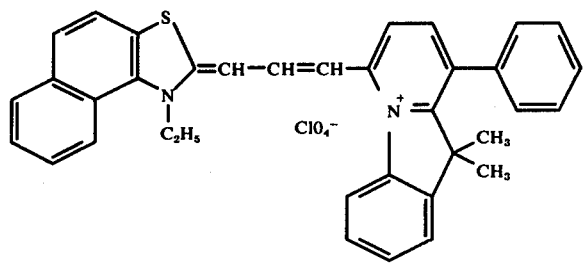

17. A photographic silver halide emulsion as defined in claim 4 wherein said dye has the formula:

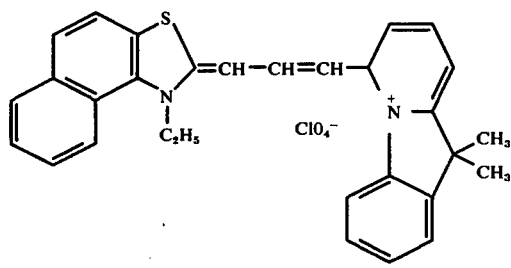

18. A photographic silver halide emulsion containing about 25 to 1000 mg. per mole of silver of a dye selected from the group consisting of 3'-ethyl-10,10-dimethyl-6-pyrido[1,2-a]inidolothiacarbocyanine salt;

10,10,10',10'-tetramethyl-6-pyrido[1,2-a]indolocarbocyanine salt;

3'-ethyl-10,10-dimethyl-6-pyrido[1,2-a]indolothiacarbocyanine salt;

3-ethyl-5-[(6,10-dihydro-10,10-dimethylpyrido[1,2-a]-indol-6-ylidene)ethylidene]rhodanine;

1,3,3',10',10'-pentamethyl-9'-phenylindo-6'-pyrido[1,2-a]indolocarbocyanine salt;

3-ethyl-10',10'-dimethy-9'-phenyloxa-6'-pyrido[1,2-a]indolocarbocyanine salt;

3-ethyl-9',10',10'-trimethyl-oxa-6-pyrido[1,2-a]-indolocarbocyanine salt;

1,3,3,9',10',10'-hexamethyl-indo-6'-pyrido[1,2-a]-indolocarbocyanine salt;

3-ethyl-5-[(6,10-dihydro-9,10,10-trimethyl-pyrido[1,2-]-indol-6-ylidene) ethylidene]rhodanine;

1,3-diethyl-5-[(6,10-dihydro-10,10-dimethyl-pyrido[1,2-a]-indol-6-ylidene)ethylidene]-2-thiobarbituric acid;

1,3-diethyl-5-[(6,10-dihydro-9,10,10-trimethyl-pyrido[1,2-a]-indol-6-ylidene)ethylidene]-2-thiobarbituric acid;

1,3,10', 10'-pentamethyl-indo-6'pyrido[1,2-a]-indolocarbocyanine salt;

3-ethyl-10',10'-dimethyl-oxa-6'-pyrido[1,2-a]indolocarbocyanine salt;

3'-ethyl-10,10-dimethyl-8-pyrido[1,2-a]indolothiacarbocyanine salt; and 3-ethyl-5-[(8,10-dihydro-10,10-dimethylpyrido[1,2-a]-indol-8-ylidene)ethylidene]rhodanine.

19. A photographic silver halide emulsion spectrally sensitized with a dye selected from 4-ethoxycarbonyl-3'-ethyl-5-phenyl-3-5H-pyrido[1,2-a]benzimidazolothiacarbocyanine perchlorate; 4-ethoxycarbonyl-3'-ethyl-1,2-dihydro-5-phenyl-4',5'-benzo-3-5H-pyrido[1,2-a]benzimidazolothiacyanine perchlorate; 4-ethoxycarbonyl-3'-ethyl-1,2-dihydro-5-phenyl-3-5H-pyrido[1,2-a]-benzimidazolothiacarbocyanine perchlorate; 3'-ethyl-1,2-dihydro3-pyrido[2,1-b]benzothiazolothiacyanine perchlorate; 3'-ethyl-3-pyrido[2,1-b]benzothiazolothiacarbocyanine perchlorate; 4-ethoxycarbonyl-3'-ethyl-5-methyl-4',5'-benzo-3-5H-pyrido[1,2-a]-benzimidazolothiacarbocyanine perchlorate; 3-ethyl-5[(1,2,3,5-tetrahydro-5-methyl-pyrido[1,2-a]benzimidazol-3-ylidene)ethylidene]-rhodanine; 4-ethoxycarbonyl-3'-ethyl-5-methyl-1-5H-pyrido[1,2-a]benzimidazolothiacarbocyanine perchlorate; 8-chloro-3', 5-diethyl-3-5H-pyrido[1,2-a]benzimidazolothiacarbocyanine perchlorate and 8-chloro-4-ethoxycarbonyl-3',5-diethyl-1,2-dihydro-4',5'-benzo-3-5H-pyrido[1,2-a]benzimidazolothiacyanine perchlorate.

* * * * *

Page 1 of 2

UNITED STATES PATENT AND TRADEMARK OFFICE

CERTIFICATE OF CORRECTION

PATENT NO. : 4,003,750

DATED : January 18, 1977

INVENTOR(S) : Donald W. Heseltine, Donald W. Kurtz, Derek D. Chapman and James K. Elwood It is certified that error appears in the above-identified patent and that said Letters Patent are hereby corrected as shown below:

Column 49, line 48, "R'" should read --Y'--.

Column 50, line 65, that part of formula reading

" 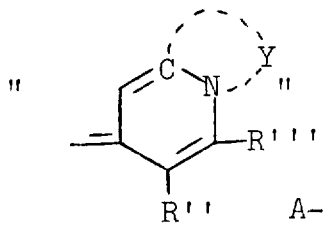 "    should read --  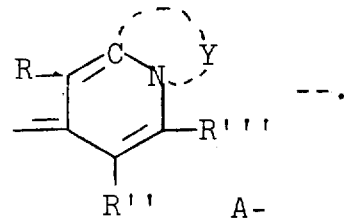  --.

Column 52, line 15, that part of formula reading

" 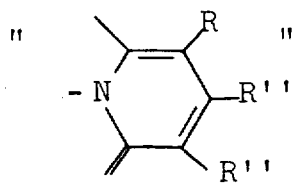 "    should read --  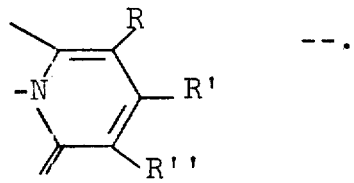  --.

UNITED STATES PATENT AND TRADEMARK OFFICE
CERTIFICATE OF CORRECTION

PATENT NO. : 4,003,750
DATED : January 18, 1977
INVENTOR(S) : Donald W. Heseltine, Donald W. Kurtz, Derek D. Chapman and James K. Elwood It is certified that error appears in the above-identified patent and that said Letters Patent are hereby corrected as shown below:

Column 54, line 8, " R'''| " should read -- R''' --; line 13, "toms" should read --atoms--; and, line 15, "Y'' " should read --Y' --.

Column 56, line 25, "1',2':1,-" should read -- [1',2':1,- --.

Column 58, line 8, "pyrido[1,2-]-" should read -- pyrido[1,2-a]- --.

Signed and Sealed this

Twenty-sixth Day of April 1977

[SEAL]

Attest:

RUTH C. MASON
*Attesting Officer*

C. MARSHALL DANN
*Commissioner of Patents and Trademarks*